(12) United States Patent
Kraus et al.

(10) Patent No.: US 11,673,367 B2
(45) Date of Patent: *Jun. 13, 2023

(54) EMBOSSED FIBROUS STRUCTURES AND METHODS FOR MAKING SAME

(71) Applicant: The Procter & Gamble Company, Cincinnati, OH (US)

(72) Inventors: Christopher Scott Kraus, Sunman, IN (US); David William Cabell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,228

(22) Filed: Aug. 17, 2021

(65) Prior Publication Data

US 2021/0379863 A1    Dec. 9, 2021

Related U.S. Application Data

(63) Continuation of application No. 13/772,408, filed on Feb. 21, 2013, now Pat. No. 11,090,900.

(60) Provisional application No. 61/601,802, filed on Feb. 22, 2012.

(51) Int. Cl.
| | |
|---|---|
| *B32B 5/26* | (2006.01) |
| *B32B 3/30* | (2006.01) |
| *D21H 27/00* | (2006.01) |
| *D21H 13/30* | (2006.01) |
| *D21H 27/02* | (2006.01) |
| *D21H 15/06* | (2006.01) |
| *D04H 3/03* | (2012.01) |
| *D21H 27/30* | (2006.01) |
| *A47K 10/16* | (2006.01) |

(52) U.S. Cl.
CPC ............ *B32B 5/26* (2013.01); *B32B 3/30* (2013.01); *D04H 3/03* (2013.01); *D21H 13/30* (2013.01); *D21H 15/06* (2013.01); *D21H 27/002* (2013.01); *D21H 27/02* (2013.01); *A47K 10/16* (2013.01); *D21H 27/30* (2013.01); *Y10T 428/24612* (2015.01)

(58) Field of Classification Search
CPC . B31F 1/36; A61F 2013/51078–51088; D21H 15/06

See application file for complete search history.

(56) References Cited

U.S. PATENT DOCUMENTS

| | | |
|---|---|---|
| 4,992,324 A | 2/1991 | Dube |
| 6,087,551 A | 7/2000 | Pereira |
| 7,041,369 B1 | 5/2006 | Mackey et al. |
| 2002/0151857 A1 | 10/2002 | Bast et al. |
| 2003/0203196 A1 | 10/2003 | Trokhan |

(Continued)

FOREIGN PATENT DOCUMENTS

| | | |
|---|---|---|
| EP | 2140844 A1 | 1/2010 |
| WO | 2011019895 A1 | 2/2011 |

(Continued)

OTHER PUBLICATIONS

All Office Actions, U.S. Appl. No. 13/772,408.

(Continued)

*Primary Examiner* — Z. Jim Yang
(74) *Attorney, Agent, or Firm* — C. Brant Cook

(57) ABSTRACT

Embossed fibrous structures containing a plurality of filaments and methods for making same are provided.

13 Claims, 14 Drawing Sheets

(56) References Cited

U.S. PATENT DOCUMENTS

| | | |
|---|---|---|
| 2005/0247397 A1 | 11/2005 | Kraus et al. |
| 2006/0160448 A1 | 7/2006 | Abraham et al. |
| 2006/0275347 A1 | 12/2006 | Evers et al. |
| 2007/0039704 A1 | 2/2007 | Cabell et al. |
| 2007/0156107 A1 | 7/2007 | Kimura et al. |
| 2007/0272381 A1 | 11/2007 | Elony et al. |
| 2008/0003913 A1 | 1/2008 | Vinson et al. |
| 2008/0156433 A1 | 7/2008 | Szypka |
| 2009/0022983 A1 | 1/2009 | Cabell et al. |
| 2009/0023839 A1 | 1/2009 | Barnholtz et al. |
| 2010/0028621 A1 | 2/2010 | Byrne et al. |
| 2010/0051221 A1 | 3/2010 | Griffiths |
| 2010/0209308 A1 | 8/2010 | Kunze et al. |
| 2010/0209668 A1 | 8/2010 | Ducker et al. |
| 2010/0224338 A1 | 9/2010 | Harper et al. |
| 2011/0039054 A1 | 2/2011 | Cabell et al. |
| 2011/0039074 A1 | 2/2011 | Cabell et al. |
| 2011/0039469 A1 | 2/2011 | Cabell et al. |
| 2011/0039489 A1 | 2/2011 | Pedigo et al. |
| 2011/0100574 A1 | 5/2011 | Barnholtz et al. |
| 2011/0104970 A1 | 5/2011 | Barnholtz et al. |
| 2011/0152816 A1 | 6/2011 | Zhou et al. |
| 2012/0177888 A1 | 7/2012 | Escafere et al. |
| 2013/0216789 A1 | 8/2013 | Kraus et al. |

FOREIGN PATENT DOCUMENTS

| | | |
|---|---|---|
| WO | 2011019905 A1 | 2/2011 |
| WO | 2011019908 A1 | 2/2011 |
| WO | 2011053946 A1 | 5/2011 |
| WO | 2011053955 A2 | 5/2011 |

OTHER PUBLICATIONS

International Search Report and Written Opinion; Application No. PCTUS2013/027075 dated May 13, 2013; 10 pages.
NPL on various types of pulp fibers (NPL_Pulp_Fiber). Retrieved from http://www.paperonweb.com/gradepl.htm on Aug. 21, 2014.

EMBOSSED FIBROUS STRUCTURES AND METHODS FOR MAKING SAME

FIELD OF THE INVENTION

The present invention relates to fibrous structures, more particularly to embossed fibrous structures comprising a plurality of filaments, and even more particularly to embossed multi-ply sanitary tissue products comprising fibrous structure plies comprising a plurality of filaments and one or more embossments, and methods for making such fibrous structures.

BACKGROUND OF THE INVENTION

Embossed fibrous structures comprising filaments, such as polyvinyl alcohol filaments or starch filaments, are known in the art. However, consumer acceptance for such embossed fibrous structures has been hindered by the fact that the embossments relax and make them less visible to consumers. Accordingly, there is a need to create embossments in fibrous structures comprising a plurality of filaments, especially where the embossments comprise one or more filaments that are more visible to consumers.

As shown in FIG. 1, it is known in the art to emboss a single-ply of fibrous structure, for example comprising starch filaments, by applying moisture to the fibrous structure and then passing the fibrous structure through an embossing nip formed by a non-heated embossing roll and a rubber roll. The embossed fibrous structure may then pass through a nip formed by the non-heated embossing roll and a heated anvil roll. It is not known in the art to pass a fibrous structure comprising filaments, such as polysaccharide filaments, for example starch filaments, through an embossing nip formed by a heated embossing roll.

In the non-filament fibrous structure art, such as cellulosic pulp fiber fibrous structure art, it is known to apply steam to cellulosic pulp fiber fibrous structures such that the modulus of the fibrous structures themselves is reduced immediately prior to being embossed. This decrease in modulus results in a decrease in tensile and is associated with the disruption of hydrogen bonds, which are the bonds that provide the cellulosic pulp fiber fibrous structures their integrity and strength. Such cellulosic pulp fiber fibrous structures do not include filaments that extend through the embossments. Unlike the cellulosic pulp fiber fibrous structures, filament-based fibrous structures comprise filaments that oftentimes use entanglement with each other and/or thermal bonds to provide the strength and integrity of the fibrous structures. Typically, cellulosic pulp fiber fibrous structures rely on hydrogen bonds and/or temporary or permanent wet strength external crosslinking agents to provide strength and integrity.

It is also known in the art to impart thermal bonds to fibrous structures comprising filaments. Thermal bonds cause the polymers in the filaments to melt and/or soften and flow such that two or more of the filaments fuse together. Thermal bonds, especially for starch filaments, are typically imparted to the fibrous structure comprising the starch filaments prior to the crosslinking of the starch filaments. For purposes of the present invention, thermal bonds are not within the scope of embossments. Although a thermal bond may form a part of an embossment merely by the fact that an embossment may be larger than a thermal bond and thus encompass a thermal bond or part thereof when an embossment is imparted to the fibrous structure.

Accordingly, there is a need for an embossed fibrous structure, for example an embossed multi-ply fibrous structure and/or an embossed multi-ply sanitary tissue product comprising two or more fibrous structure plies that comprise a plurality of filaments, for example starch filaments, and methods for making such fibrous structures.

SUMMARY OF THE INVENTION

The present invention fulfills the needs described above by providing novel embossed fibrous structure, for example an embossed multi-ply fibrous structure and/or an embossed multi-ply sanitary tissue product comprising two or more fibrous structure plies that comprise a plurality of filaments, for example starch filaments, and methods for making such fibrous structures.

In one example of the present invention, an embossed multi-ply sanitary tissue product formed by embossing a multi-ply fibrous structure comprising a first ply of fibrous structure comprising a plurality of filaments and a second ply of fibrous structure, is provided.

In another example of the present invention, a method for making an embossed multi-ply sanitary tissue product, the method comprising the steps of:
 a. providing a multi-ply sanitary tissue product comprising a first ply of fibrous structure comprising a plurality of filaments and a second ply of fibrous structure; and
 b. embossing the multi-ply sanitary tissue product with a heated emboss roll to form the embossed multi-ply sanitary tissue product, is provided.

In yet another example of the present invention, an embossed multi-ply sanitary tissue product made according to a method of the present invention, is provided.

In still another example of the present invention, a method for making an embossed fibrous structure, the method comprising the steps of:
 a. providing a fibrous structure comprising a plurality of polysaccharide filaments; and
 b. embossing the fibrous structure with a heated emboss roll to form the embossed fibrous structure, is provided.

In still yet another example of the present invention, an embossed fibrous structure made according to a method of the present invention, is provided.

In even another example of the present invention, a method for making an embossed multi-ply sanitary tissue product, the method comprising the steps of:
 a. passing a multi-ply sanitary tissue product comprising a first ply of fibrous structure comprising a plurality of filaments and a second ply of fibrous structure through a nip formed by a heated anvil roll and a non-heated emboss roll; and
 b. embossing the multi-ply sanitary tissue product with the non-heated emboss roll to form the embossed multi-ply sanitary tissue product, is provided.

In yet another example of the present invention, an embossed multi-ply sanitary tissue product made according to a method of the present invention, is provided.

In still another example of the present invention, a method for making an embossed fibrous structure, the method comprising the steps of:
 a. passing a fibrous structure comprising a plurality of polysaccharide filaments through a nip formed by a heated anvil roll and a non-heated emboss roll; and
 b. embossing the fibrous structure with the non-heated emboss roll to form the embossed fibrous structure, is provided.

In still yet another example of the present invention, an embossed fibrous structure made according to a method of the present invention, is provided.

Accordingly, the present invention provides novel embossed fibrous structures, for example an embossed multi-ply fibrous structures and/or an embossed multi-ply sanitary tissue products comprising two or more fibrous structure plies that comprise a plurality of filaments, for example starch filaments, and methods for making such fibrous structures.

DETAILED DESCRIPTION OF THE INVENTION

Definitions

Figure 1:
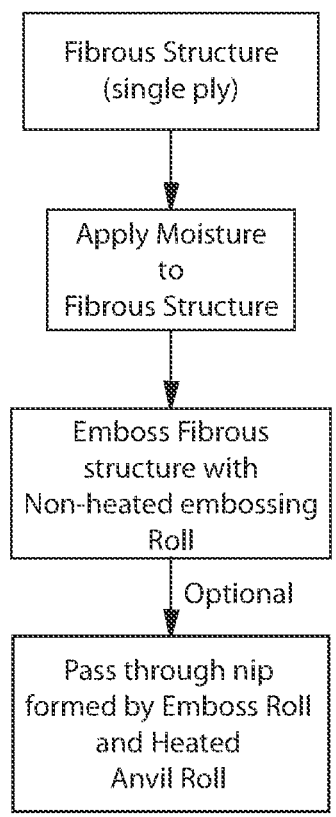
FIG. 1 is a schematic flowchart of a prior art embossing process.

"Fibrous structure" as used herein means a structure that comprises one or more filaments, for example a plurality of filaments, and optionally, one or more solid additives, such as a plurality of pulp fibers. In one example, a fibrous structure according to the present invention is an association of filaments and optionally solid additives that together form a structure capable of performing a function.

Non-limiting examples of processes for making fibrous structures according to the present invention include known wet, solution, and dry filament spinning processes that are typically referred to as nonwoven processes. In one example, the filament spinning process is a meltblowing process where filaments are provided from a meltblow die (a filament source). Further processing of the fibrous structure may be carried out such that a finished fibrous structure is formed. For example, the finished fibrous structure is a fibrous structure that is wound on a reel at the end of a fibrous structure making process. The finished fibrous structure may subsequently be converted into a finished product, e.g. a sanitary tissue product.

"Filament" as used herein means an elongate particulate having a length greatly exceeding its average diameter, i.e. a length to average diameter ratio of at least about 10. In one example, the filament is a single filament rather than a yarn, which is a strand of filaments twisted together along their lengths. In one example, a filament exhibits a length of greater than or equal to 5.08 cm and/or greater than or equal to 7.62 cm and/or greater than or equal to 10.16 cm and/or greater than or equal to 15.24 cm.

Filaments are typically considered continuous or substantially continuous in nature especially with respect to the fibrous structure in which they are present. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

The filaments of the present invention may be monocomponent and/or multicomponent. For example, the filaments may comprise bicomponent filaments. The bicomponent filaments may be in any form, such as side-by-side, core and sheath, islands-in-the-sea and the like.

"Solid additive" as used herein means a solid particulate such as a powder, granule, and/or fiber.

"Fiber" as used herein means an elongate particulate as described above that exhibits a length of less than 5.08 cm and/or less than 3.81 cm and/or less than 2.54 cm.

Fibers are typically considered discontinuous in nature especially with respect to the fibrous structure. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm thus producing staple fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell and bagasse fibers can be used in the fibrous structures of the present invention.

In another example, the fibrous structure may comprise solid additives that comprise trichomes and/or seed hairs.

"Sanitary tissue product" as used herein means a fibrous structure useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

In one example, the sanitary tissue product of the present invention comprises one or more fibrous structures according to the present invention.

The sanitary tissue products of the present invention may exhibit a basis weight between about 10 g/m² to about 120 g/m² and/or from about 15 g/m² to about 110 g/m² and/or from about 20 g/m² to about 100 g/m² and/or from about 30 to 90 g/m². In addition, the sanitary tissue product of the present invention may exhibit a basis weight between about 40 g/m² to about 120 g/m² and/or from about 50 g/m² to about 110 g/m² and/or from about 55 g/m² to about 105 g/m² and/or from about 60 to 100 g/m².

The sanitary tissue products of the present invention may exhibit a density of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Embossed" as used herein with respect to a fibrous structure means a fibrous structure that has been subjected to a process which converts a smooth surfaced fibrous structure to a decorative surface by replicating a design on one or more emboss rolls, which form a nip through which the fibrous structure passes. Embossed does not include creping, microcreping, printing or other processes that may impart a texture and/or decorative pattern to a fibrous structure.

"Embossment" as used herein means a deformation of the fibrous structure or portion of the fibrous structure in the Z-plane such that the surface of the fibrous structure comprises a protrusion or a depression. The embossment may be made by conventional embossing procedures known in the art or they may be made by forming the fibrous structure on a deflection member such as described in U.S. Pat. No. 4,637,859 and/or on an imprinting carrier fabric as described in U.S. Pat. Nos. 3,301,746, 3,821,068, 3,974,025, 3,573,164, 3,473,576, 4,239,065 and 4,528,239. Embossments according to the present invention may exhibit a dry structural height of at least about 10 µm and/or at least about 25 µm and/or at least about 50 µm and/or at least about 100 µm and/or at least about 150 µm and/or at least about 200 µm and/or at least about 250 µm and/or at least about 300 µm and/or at least about 400 µm and/or at least about 500 µm and/or at least about 600 µm as measured by the Embossment Height Test Method described herein.

In one example, the embossments may be line element embossments or dot embossments.

Embossments according to the present invention may exhibit a ratio of greatest geometric dimension to minimum geometric dimension (often referred to as an aspect ratio) of less than about 50:1 and/or less than about 30:1 and/or less than about 15:1 and/or less than about 10:1 and/or less than about 5:1 and/or less than about 2:1 and/or about 1:1. The embossments may be dots and/or dashes. A plurality of embossments may combine to form a "macro" pattern on the fibrous structure surface that encompasses and/or covers less than the entire surface of the fibrous structure. In addition to the embossments, there may be other deformations (protrusions or depressions) that are less visible on the fibrous structure that encompass and/or cover almost the entire surface of the fibrous structure. Such other deformations form a "micro" pattern on the fibrous structure surface.

"Scrim" or "scrim material" as used herein means a web material, such as a web comprising filaments that is used to overlay solid additives within the fibrous structures of the present invention such that the solid additives are positioned between the web material and another layer of filaments within the fibrous structures. In one example, the scrim comprises a web material that exhibits a basis weight of less than 10 g/m² and/or less than 7 g/m² and/or less than 5 g/m² and/or less than 3 g/m² and the remaining layer(s) of filaments of the fibrous structure of the present invention exhibit a basis weight of greater than 10 g/m² and/or greater than 15 g/m² and/or greater than 20 g/m² and/or to about 120 g/m².

"Hydroxyl polymer" as used herein includes any hydroxyl-containing polymer from which filaments of the present invention may be made. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a filament as a whole and/or a polymer within a filament, that the filament and/or polymer exhibits no melting point and/or softening point, which allows it to flow under pressure, in the absence of a plasticizer, such as water, glycerin, sorbitol, urea and the like.

"Thermoplastic" as used herein means, with respect to a filament as a whole and/or a polymer within a filament, that the filament and/or polymer exhibits a melting point and/or softening point at a certain temperature, which allows it to flow under pressure.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Associate," "Associated," "Association," and/or "Associating" as used herein with respect to filaments means combining, either in direct contact or in indirect contact, filaments such that a fibrous structure is formed. In one example, the associated filaments may be bonded together for example by adhesives and/or thermal bonds. In another example, the filaments may be associated with one another by being deposited onto the same fibrous structure making belt.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in $g/m^2$.

"Machine Direction" or "MD" as used herein means the direction parallel to the flow of the fibrous structure through a fibrous structure making machine, such as a papermaking machine and/or product manufacturing equipment.

"Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

"Spinnerette" as used herein means a plate that comprises one or more filament forming nozzles from which filaments of a melt composition can flow. In one example, the spinnerette comprises a plurality of filament forming nozzles arranged in one or more rows and/or columns. Such a spinnerette is referred to as a multi-row spinnerette.

"Abut one another" as used herein with reference to two or more spinnerettes that abut one another means that a surface of one spinnerette is in contact with a surface of another spinnerette.

"Seam" as used herein means the line of contact between two abutting spinnerettes.

"Seam filament forming nozzle opening" as used herein means one or more filament forming nozzle openings that are closest in distance to the seam formed by two abutting spinnerettes.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Filaments

In one example, the fibrous structure of the present invention comprises filaments comprising a hydroxyl polymer. In another example, the fibrous structure may comprise starch and/or starch derivative filaments. The starch filaments may further comprise polyvinyl alcohol and/or other polymers.

The filaments of the present invention may be produced from a polymer melt composition comprising a hydroxyl polymer, such as an uncrosslinked starch, a crosslinking system comprising a crosslinking agent, such as an imidazolidinone, and water. The polymer melt composition may also comprise a surfactant, such as a sulfosuccinate surfactant. A non-limiting example of a suitable sulfosuccinate surfactant comprises Aerosol® AOT (a sodium dioctyl sulfosuccinate) and/or Aerosol® MA-80 (a sodium dihexyl sulfosuccinate), which is commercially available from Cytec Industries, Woodland Park, N.J.

In one example, the filaments of the present invention comprise greater than 25% and/or greater than 40% and/or greater than 50% and/or greater than 60% and/or greater than 70% to about 95% and/or to about 90% and/or to about 80% by weight of the filament of a hydroxyl polymer, such as starch, which may be in a crosslinked state. In one example, the filament comprises an ethoxylated starch and an acid thinned starch, which may be in their crosslinked states.

In addition to the hydroxyl polymer, the filament may comprise polyvinyl alcohol at a level of from 0% and/or from 0.5% and/or from 1% and/or from 3% to about 15% and/or to about 12% and/or to about 10% and/or to about 7% by weight of the filament.

The filaments may comprise a surfactant, such as a sulfosuccinate surfactant, at a level of from 0% and/or from about 0.1% and/or from about 0.3% to about 2% and/or to about 1.5% and/or to about 1.1% and/or to about 0.7% by weight of the filament.

The filaments may also comprise a polymer selected from the group consisting of: polyacrylamide and its derivatives; polyacrylic acid, polymethacrylic acid, and their esters; polyethyleneimine; copolymers made from mixtures of monomers of the aforementioned polymers; and mixtures thereof at a level of from 0% and/or from about 0.01% and/or from about 0.05% and/or to about 0.5% and/or to about 0.3% and/or to about 0.2% by weight of the filament. Such polymers may exhibits a weight average molecular weight of greater than 500,000 g/mol. In one example, the filament comprises polyacrylamide.

The filaments may also comprise a crosslinking agent, such as an imidazolidinone, which may be in its crosslinked state (crosslinking the hydroxyl polymers present in the filaments) at a level of from about 0.5% and/or from about 1% and/or from about 2% and/or from about 3% and/or to about 10% and/or to about 7% and/or to about 5.5% and/or to about 4.5% by weight of the filament. In addition to the crosslinking agent, the filament may comprise a crosslinking facilitator that aids the crosslinking agent at a level of from 0% and/or from about 0.3% and/or from about 0.5% and/or to about 2% and/or to about 1.7% and/or to about 1.5% by weight of the filament.

The filament may also comprise various other ingredients such as propylene glycol, sorbitol, glycerine, and mixtures thereof.

Polymers

The filaments of the present invention that associate to form the fibrous structures of the present invention may contain various types of polymers such as hydroxyl polymers, non-thermoplastic polymers, thermoplastic polymers and mixtures thereof.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention is a polysaccharide.

In another example, a hydroxyl polymer of the present invention is a non-thermoplastic polymer.

The hydroxyl polymer may have a weight average molecular weight of from about 10,000 g/mol to about 40,000,000 g/mol and/or greater than about 100,000 g/mol and/or greater than about 1,000,000 g/mol and/or greater than about 3,000,000 g/mol and/or greater than about 3,000,000 g/mol to about 40,000,000 g/mol. Higher and lower molecular weight hydroxyl polymers may be used in combination with hydroxyl polymers having a certain desired weight average molecular weight.

Well known modifications of hydroxyl polymers, such as natural starches, include chemical modifications and/or enzymatic modifications. For example, natural starch can be acid-thinned, hydroxy-ethylated, hydroxy-propylated, and/or oxidized. In addition, the hydroxyl polymer may comprise dent corn starch hydroxyl polymer.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate. In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, chitosan, chitosan derivatives, cellulose, cellulose derivatives, hemicellulose, hemicellulose derivatives, gums, arabinans, galactans and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000.

Non-cellulose and/or non-cellulose derivative and/or non-cellulose copolymer hydroxyl polymers, such as non-cellulose polysaccharides may be selected from the group consisting of: starches, starch derivatives, chitosan, chitosan derivatives, hemicellulose, hemicellulose derivatives, gums, arabinans, galactans and mixtures thereof.

In one example, the filaments of the present invention are void of thermoplastic, water-insoluble polymers.

Solid Additives

Solid additives of the present invention can be applied to a surface of a layer of filaments in a solid form. In other words, the solid additives of the present invention can be delivered directly to a surface of a layer of filaments without a liquid phase being present, i.e. without melting the solid additive and without suspending the solid additive in a liquid vehicle or carrier. As such, the solid additive of the present invention does not require a liquid state or a liquid vehicle or carrier in order to be delivered to a surface of a layer of filaments. The solid additive of the present invention may be delivered via a gas or combinations of gases. In one example, in simplistic terms, a solid additive is an additive that when placed within a container, does not take the shape of the container.

The solid additives of the present invention may have different geometries and/or cross-sectional areas that include round, elliptical, star-shaped, rectangular, trilobal and other various eccentricities.

In one example, the solid additive may exhibit a particle size of less than 6 mm and/or less than 5.5 mm and/or less than 5 mm and/or less than 4.5 mm and/or less than 4 mm and/or less than 2 mm in its maximum dimension.

The solid additive of the present invention may exhibit an aspect ratio of less than about 25/1 and/or less than about 15/1 and/or less than about 10/1 and/or less than 5/1 to about 1/1. A particle is not a fiber as defined herein.

The solid additives may be present in the fibrous structures of the present invention at a level of greater than about 1 and/or greater than about 2 and/or greater than about 4 and/or to about 20 and/or to about 15 and/or to about 10 g/m$^2$. In one example, a fibrous structure of the present invention comprises from about 2 to about 10 and/or from about 5 to about 10 g/m$^2$ of solid additives.

In one example, the solid additives are present in the fibrous structures of the present invention at a level of greater than 5% and/or greater than 10% and/or greater than 20% to about 50% and/or to about 40% and/or to about 30% by weight.

In one example, the solid additives 14 comprise fibers, for example wood pulp fibers. The wood pulp fibers may be softwood pulp fibers and/or hardwood pulp fibers. In one example, the wood pulp fibers comprise eucalyptus pulp fibers. In another example, the wood pulp fibers comprise Southern Softwood Kraft (SSK) pulp fibers.

The solid additives may be chemically treated, for example chemically treated pulp fibers. In one example, the solid additives comprise softening agents and/or are surface treated with softening agents. Non-limiting examples of suitable softening agents include silicones and/or quaternary ammonium compounds, such as PROSOFT® available from Hercules Incorporated. In one example, the solid additives comprise a wood pulp treated with a quaternary ammonium compound softening agent, an example of which is available from Georgia-Pacific Corporation. One advantage of applying a softening agent only to the solid additives versus applying it to the entire fibrous structure and/or nonwoven substrate and/or bonding material, ensures that the softening agent softens those components of the entire fibrous structure that need softening compared to the other components of the entire fibrous structure.

Nonwoven Substrate

The nonwoven substrate of the present invention comprises one or more layers of filaments. Two or more layers of filaments making up the nonwoven substrate may have the same or different orientations. In one example, the nonwoven substrate comprises two or more layers of filaments that exhibit different orientations.

In one example, the nonwoven substrate comprises a plurality of filaments comprising a hydroxyl polymer. The hydroxyl polymer may be selected from the group consisting of polysaccharides, derivatives thereof, polyvinyl alcohol, derivatives thereof and mixtures thereof. In one example, the hydroxyl polymer comprises a starch and/or starch derivative. The nonwoven substrate 12 may exhibit a basis weight of greater than about 10 g/m² and/or greater than about 14 g/m² and/or greater than about 20 g/m² and/or greater than about 25 g/m² and/or greater than about 30 g/m² and/or greater than about 35 g/m² and/or greater than about 40 g/m² and/or less than about 100 g/m² and/or less than about 90 g/m² and/or less than about 80 g/m².

Fibrous Structures

Figure 2:
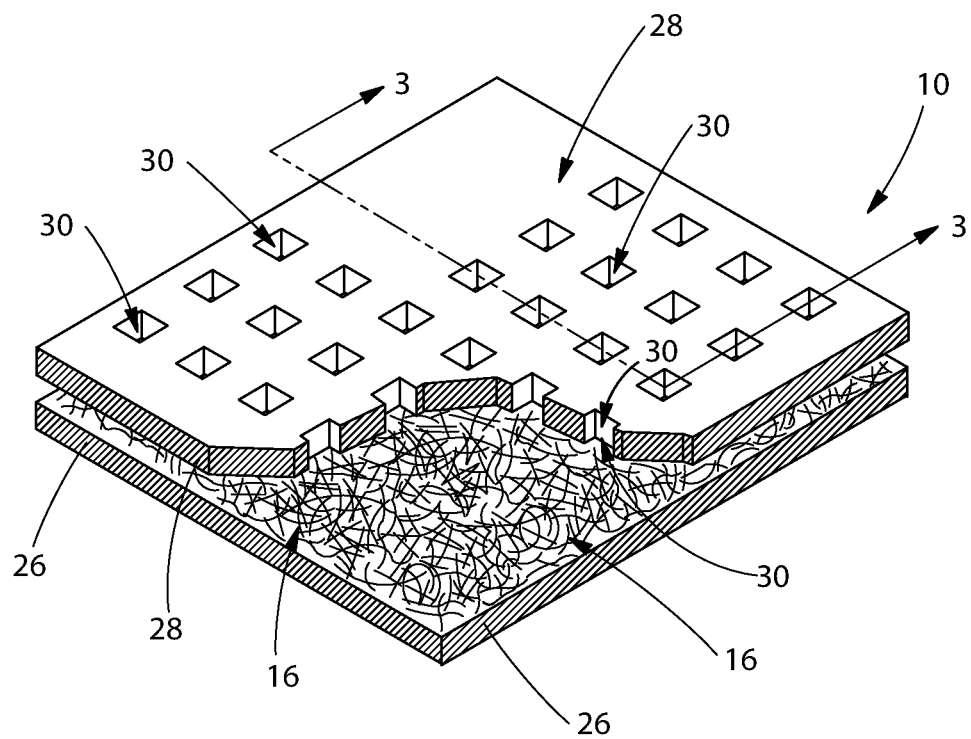
FIG. 2 is a schematic representation of one example of a fibrous structure in accordance with the present invention.
Figure 3:
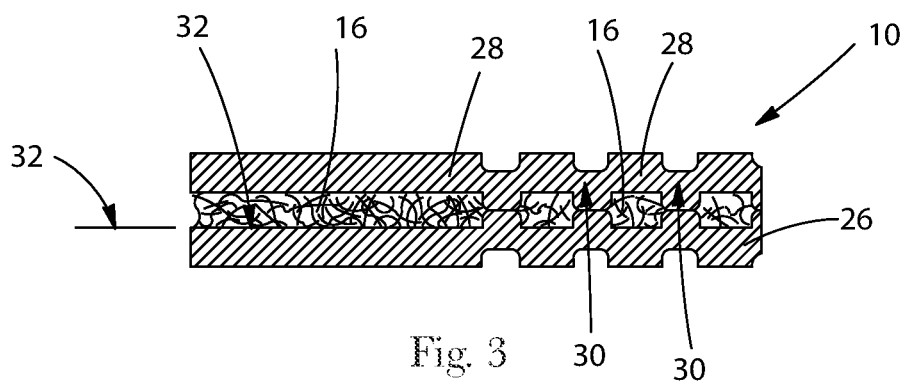
FIG. 3 is a cross-sectional view of the fibrous structure of FIG. 2 taken along line 3-3.

In one example, as shown in FIGS. 2 and 3, the fibrous structure 10 of the present invention comprises a nonwoven substrate 26 comprising one or more layers of filaments, a plurality of solid additives 16, such as pulp fibers that are positioned between the nonwoven substrate 26 and a scrim 28 which is bonded to the nonwoven substrate 26 at one or more bond sites 30. The bond site 30 is where at least a portion of the scrim 28 and a portion of the nonwoven substrate 26 are connected to one another, such as via a thermal bond, or a bond created by applying high pressure to both the scrim 28 and the nonwoven substrate 26 such that a glassining effect occurs.

In one example, the solid additives 16 may be uniformly distributed on a surface 32 of the nonwoven substrate 26.

In one example, the scrim 28 comprises one or more layers of filaments of the present invention. In one example, the scrim 28 consists of a single layer of filaments of the present invention. The scrim 28 and nonwoven substrate 26 may comprise filaments having the same composition, for example hydroxyl polymer-containing filaments, such as starch filaments. The scrim 28 may be present in the fibrous structure of the present invention at a basis weight of greater than 0.1 and/or greater than 0.3 and/or greater than 0.5 and/or greater than 1 and/or greater than 2 g/m² and/or less than 10 and/or less than 7 and/or less than 5 and/or less than 4 g/m². In one example, the scrim 28 may be present in the fibrous structure of the present invention at a basis weight of from about 0.1 to about 4 g/m².

One purpose of the scrim 28 is to reduce the lint produced by the fibrous structure 10 by inhibiting the solid additives 16 from becoming disassociated from the fibrous structure 10. The scrim 28 may also provide additional strength properties to the fibrous structure 10.

As shown in FIGS. 2 and 3 the bond sites 30 may comprise a plurality of discrete bond sites. The discrete bond sites may be present in the form of a non-random repeating pattern. One or more bond sites 30 may comprise a thermal bond and/or a pressure bond.

In one example, the fibrous structures of the present invention comprise a plurality of filaments, such as hydroxyl polymer-containing filaments, wherein the filaments are present in the fibrous structure in two or more different layers of filaments based on their orientation in each layer.

The fibrous structures of the present invention may exhibit an average Tensile Ratio (MD Tensile/CD Tensile) of 2 or less and/or less than 1.7 and/or less than 1.5 and/or less than 1.3 and/or less than 1.1 and/or greater than 0.9 as measured according to the Dry Tensile Strength Test Method described herein. In one example, the fibrous structures of the present invention exhibit an average Tensile Ratio of from about 0.9 to about 1.1 as measured according to the Dry Tensile Strength Test Method described herein.

Table 1 below shows examples of Tensile Ratios for fibrous structures of the present invention and comparative fibrous structures.

TABLE 1

| Sample | Filaments (Y/N) | Solid Additives (Y/N) | Layers of Filaments of Different Orientation | Tensile Ratio (Average) |
|---|---|---|---|---|
| Invention Sample 1 | Y-starch | Y | Y | 1.66 |
| Invention Sample 2 | Y-starch | Y | Y | 1.51 |
| Invention Sample 3 | Y-starch | Y | Y | 1.45 |
| Invention Sample 4 | Y-starch | Y | Y | 2 |
| Invention Sample 5 | Y-starch | Y | Y | 1.69 |
| Invention Sample 6 | Y-starch | Y | Y | 1.34 |
| Invention Sample 7 | Y-starch | Y | Y | 1.21 |
| Invention Sample 8 | Y-starch | Y | Y | 1.61 |
| Invention Sample 9 | Y-starch | Y | Y | 1.77 |
| Prior Art 1 | Y-starch | Y | N | 3 |
| Prior Art 2 | Y-starch | Y | N | 3.01 |
| Prior Art 3 | Y-starch | Y | N | 2.4 |
| Prior Art 4 | Y-starch | Y | N | 2.6 |
| Prior Art 5 | Y-starch | Y | N | 2.52 |
| Prior Art 6 | Y-starch | Y | N | 3.09 |
| Prior Art 7 | Y-starch | Y | N | 2.73 |
| Charmin ® Ultra Soft | N | Y | N | 1.08 |
| Charmin ® Ultra Soft | N | Y | N | 0.96 |

The fibrous structure of the present invention may comprise a surface softening agent. The surface softening agent may be applied to a surface of the fibrous structure. The softening agent may comprise a silicone and/or a quaternary ammonium compound.

The fibrous structure of the present invention may comprise embossments such that the fibrous structure is embossed.

In one example, the fibrous structure comprises a nonwoven substrate, which has a plurality of solid additives present on both of the nonwoven substrate's opposite surfaces that are positioned between the nonwoven substrate surfaces and one or more scrims that are bonded to each of the nonwoven substrate surfaces. The solid additives may be different or the same and may be present at different levels or at same levels and may be uniformly distributed on the opposite surfaces of the nonwoven substrate. The scrim may be different or the same and may be present at different levels or at same levels and be bonded to opposite surfaces of the nonwoven substrate at one or more bond sites.

In another example, the fibrous structure of the present invention may comprise one ply within a multi-ply sanitary tissue product.

In another example, a multi-ply sanitary tissue product comprising two or more plies of the fibrous structure according to the present invention is provided. In one example, two or more plies of the fibrous structure according to the present invention are combined to form a multi-ply sanitary tissue product. The two or more plies may be combined such that the solid additives are adjacent to at least one outer surface and/or each of the outer surfaces of the multi-ply sanitary tissue product.

Methods for Making Fibrous Structure

Figure 4:
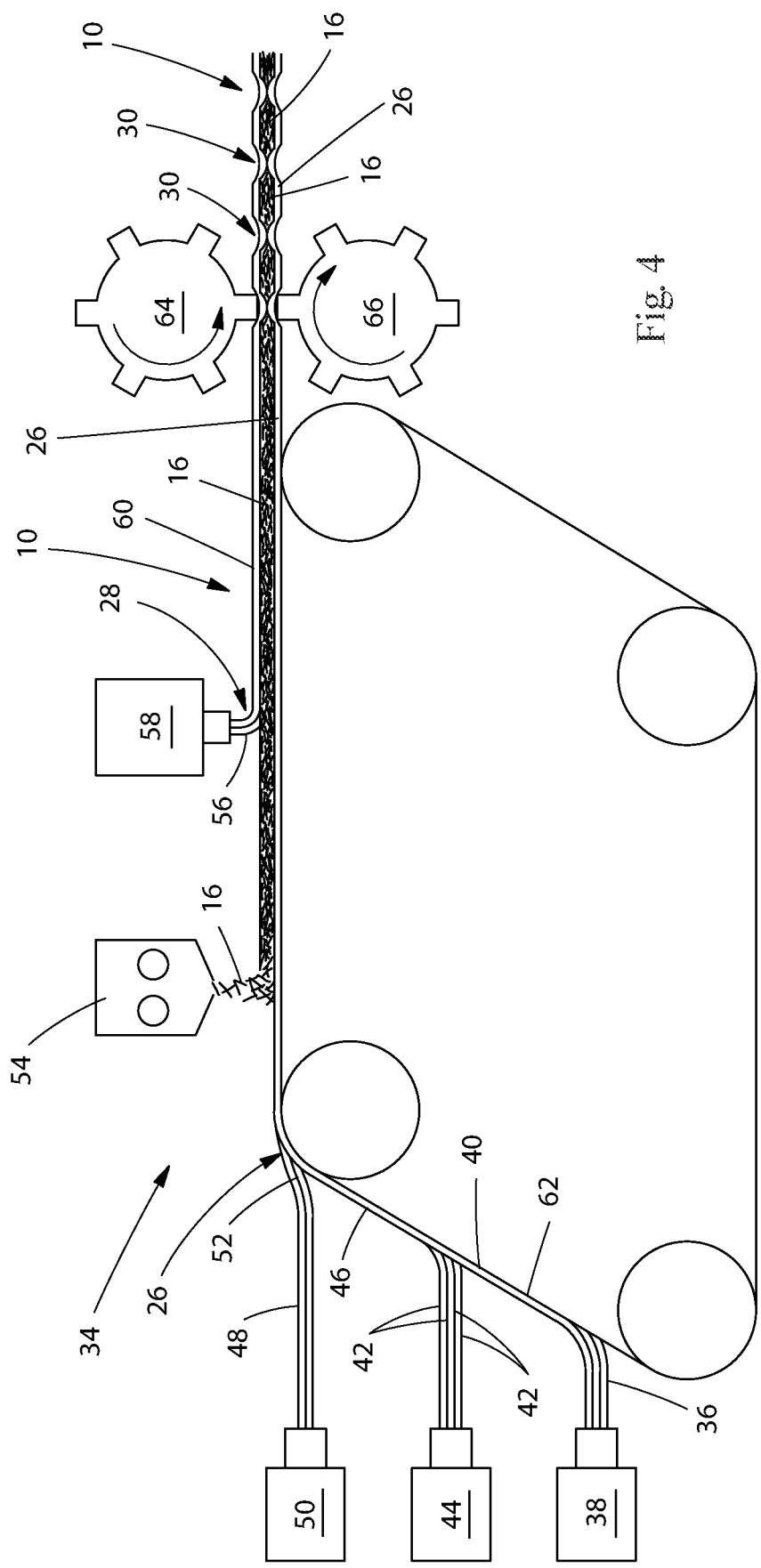
FIG. 4 is a schematic representation of one example of a method for making a fibrous structure according to the present invention.
Figure 5:
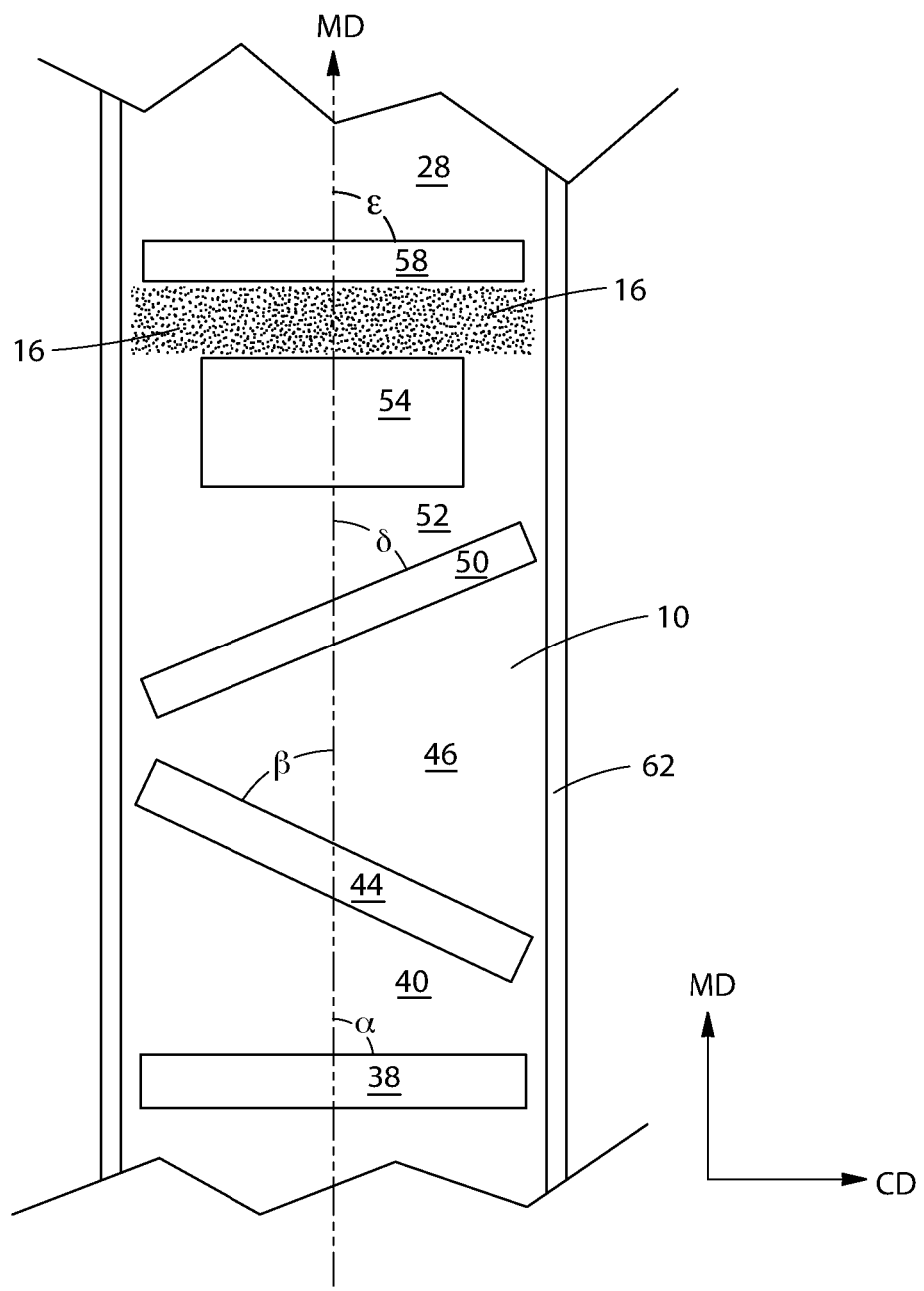
FIG. 5 is a schematic representation of one example of a portion of fibrous structure making process according to the present invention.

FIGS. 4 and 5 illustrate one example of a method for making a fibrous structure of the present invention. As shown in FIGS. 7 and 8, the method 34 comprises the steps of:

a. providing first filaments 36 from a first source 38 of filaments, which form a first layer 40 of filaments;

b. providing second filaments 42 from a second source 44 of filaments, which form a second layer 46 of filaments;

c. providing third filaments 48 from a third source 50 of filaments, which form a third layer 52 of filaments;

d. providing solid additives 16 from a source 54 of solid additives;

e. providing fourth filaments 56 from a fourth source 58 of filaments, which form a fourth layer 60 of filaments; and d. collecting the first, second, third, and fourth filaments 36, 42, 48, 56 and the solid additives 16 to form a fibrous structure 10, wherein the first source 38 of filaments is oriented at a first angle $\alpha$ to the machine direction of the fibrous structure 10, the second source 44 of filaments is oriented at a second angle $\beta$ to the machine direction different from the first angle $\alpha$, the third source 50 is oriented at a third angle $\delta$ to the machine direction different from the first angle $\alpha$ and the second angle $\beta$, and wherein the fourth source 58 is oriented at a fourth angle E to the machine direction different from the second angle $\beta$ and third angle $\delta$.

The first, second, and third layers 40, 46, 52 of filaments are collected on a collection device 62, which may be a belt or fabric. The collection device 62 may be a patterned belt that imparts a pattern, such as a non-random, repeating pattern to the fibrous structure 10 during the fibrous structure making process. The first, second, and third layers 40, 46, 52 of filaments are collected (for example one on top of the other) on the collection device 62 to form a multi-layer nonwoven substrate 26 upon which the solid additives 16 are deposited. The fourth layer 60 of filaments may then be deposited onto the solid additives 16 to form a scrim 28.

The first angle $\alpha$ and the fourth angle $\varepsilon$ may be the same angle, for example 90° to the machine direction.

The second angle $\beta$ and the third angle $\delta$ may be the same angle, just positive and negative of one another. For example the second angle $\beta$ may be −40° to the machine direction and the third angle $\delta$ may be +40° to the machine direction.

In one example, at least one of the first, second, and third angles $\alpha$, $\beta$, $\delta$ is less than 90° to the machine direction. In another example, the first angle c and/or fourth angle $\varepsilon$ is about 90° to the machine direction. In still another example, the second angle $\beta$ and/or third angle $\delta$ is from about ±10° to about ±80° and/or from about ±30° to about ±60° to the machine direction and/or about ±40° to the machine direction.

In one example, the first, second, and third layers 40, 46, 52 of filaments may be formed into a nonwoven substrate 28 prior to being utilized in the process for making a fibrous structure described above. In this case, the nonwoven substrate 28 would likely be in a parent roll that could be unwound into the fibrous structure making process and the solid additives 16 could be deposited directly onto a surface 32 of the nonwoven substrate 28.

In one example, the step of providing a plurality of solid additives 16 onto the nonwoven substrate 26 may comprise airlaying the solid additives 16 using an airlaying former. A non-limiting example of a suitable airlaying former is available from Dan-Web of Aarhus, Denmark.

In one example, the step of providing fourth filaments 56 such that the filaments contact the solid additives 16 comprises the step of depositing the fourth filaments 56 such that at least a portion (in one example all or substantially all) of the solid additives 16 are contacted by the fourth filaments 56 thus positioning the solid additives 16 between the fourth layer 60 of filaments and the nonwoven substrate 26. Once the fourth layer 60 of filaments is in place, the fibrous structure 10 may be subjected to a bonding step that bonds the fourth layer 60 of filaments (in this case, the scrim 28) to the nonwoven substrate 26. This step of bonding may comprise a thermal bonding operation. The thermal bonding operation may comprise passing the fibrous structure 10 through a nip formed by thermal bonding rolls 64, 66. At least one of the thermal bonding rolls 64, 66 may comprise a pattern that is translated into the bond sites 30 formed in the fibrous structure 10.

In addition to being subjected to a bonding operation, the fibrous structure may also be subjected to other post-processing operations such as embossing, tuft-generating, gear rolling, which includes passing the fibrous structure through a nip formed between two engaged gear rolls, moisture-imparting operations, free-fiber end generating, and surface treating to form a finished fibrous structure. In one example, the fibrous structure is subjected to gear rolling by passing the fibrous structure through a nip formed by at least a pair of gear rolls. In one example, the fibrous structure is subjected to gear rolling such that free-fiber ends are created in the fibrous structure. The gear rolling may occur before or after two or more fibrous structures are combined to form a multi-ply sanitary tissue product. If it occurs after, then the multi-ply sanitary tissue product is passed through the nip formed by at least a pair of gear rolls.

The method for making a fibrous structure of the present invention may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure can proceed directly into a converting operation rather than, for example, being convolutedly wound into a roll and then unwound to proceed through a converting operation.

In one example, one or more plies of the fibrous structure according to the present invention may be combined with another ply of fibrous structure, which may also be a fibrous structure according to the present invention, to form a multi-ply sanitary tissue product that exhibits a Tensile Ratio of 2 or less and/or less than 1.7 and/or less than 1.5 and/or less than 1.3 and/or less than 1.1 and/or greater than 0.7 and/or greater than 0.9 as measured according to the Dry Tensile Strength Test Method described herein. In one example, the multi-ply sanitary tissue product may be formed by combining two or more plies of fibrous structure according to the present invention. In another example, two or more plies of fibrous structure according to the present invention may be combined to form a multi-ply sanitary tissue product such that the solid additives present in the fibrous structure plies are adjacent to each of the outer surfaces of the multi-ply sanitary tissue product.

The process of the present invention may include preparing individual rolls of fibrous structure and/or sanitary tissue product comprising such fibrous structure(s) that are suitable for consumer use.

Figure 6:
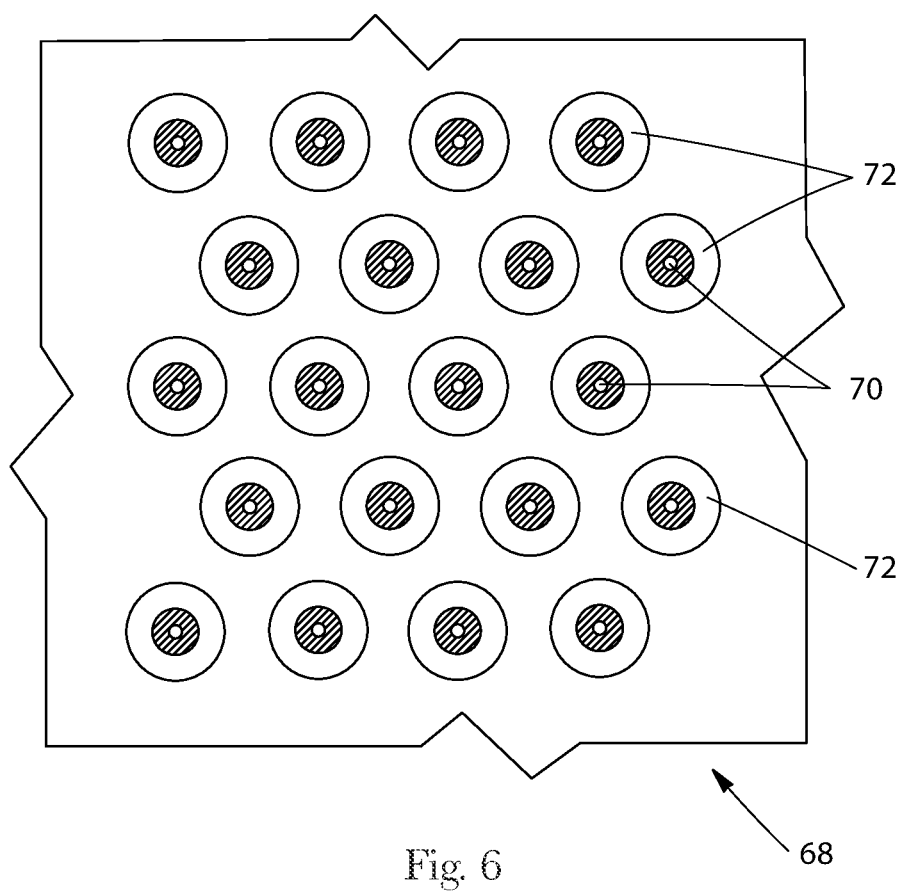
FIG. 6 is a schematic representation of an example of a meltblow die in accordance with the present invention.

In one example, the sources of filaments comprise meltblow dies that produce filaments from a polymer melt composition according to the present invention. In one example, as shown in FIG. 6 the meltblow die 68 may comprise at least one filament-forming hole 70, and/or 2 or more and/or 3 or more rows of filament-forming holes 70 from which filaments are spun. At least one row of the filament-forming holes 70 contains 2 or more and/or 3 or more and/or 10 or more and/or 10 or more filament-forming holes 70. In addition to the filament-forming holes 70, the meltblow die 68 comprises fluid-releasing holes 72, such as gas-releasing holes, in one example air-releasing holes, that provide attenuation to the filaments formed from the filament-forming holes 70. One or more fluid-releasing holes 72 may be associated with a filament-forming hole 70 such that the fluid exiting the fluid-releasing hole 72 is parallel or substantially parallel (rather than angled like a knife-edge die) to an exterior surface of a filament exiting the filament-forming hole 70. In one example, the fluid exiting the fluid-releasing hole 72 contacts the exterior surface of a filament formed from a filament-forming hole 70 at an angle of less than 30° and/or less than 20° and/or less than 10° and/or less than 5° and/or about 0°. One or more fluid releasing holes 72 may be arranged around a filament-forming hole 70. In one example, one or more fluid-releasing holes 72 are associated with a single filament-forming hole 70 such that the fluid exiting the one or more fluid releasing holes 72 contacts the exterior surface of a single filament formed from the single filament-forming hole 70. In one example, the fluid-releasing hole 72 permits a fluid, such as a gas, for example air, to contact the exterior surface of a filament formed from a filament-forming hole 70 rather than contacting an inner surface of a filament, such as what happens when a hollow filament is formed.

Synthesis of Polymer Melt Composition

A polymer melt composition of the present invention may be prepared using a screw extruder, such as a vented twin screw extruder.

Figure 7A:
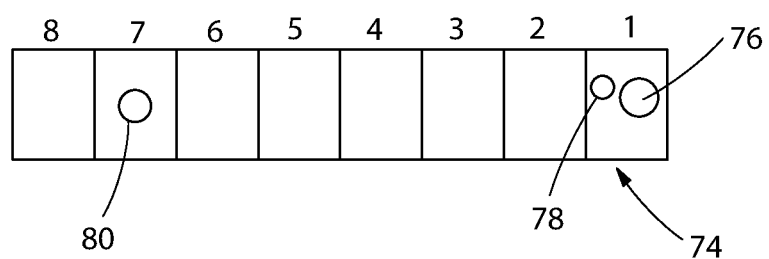
FIG. 7A is a schematic representation of an example of a barrel of a twin screw extruder in accordance with the present invention.

A barrel 74 of an APV Baker (Peterborough, England) 40:1, 48 mm twin screw extruder is schematically illustrated in FIG. 7A. The barrel 74 is separated into eight zones, identified as zones 1-8. The barrel 74 encloses the extrusion screw and mixing elements, schematically shown in FIG. 7B, and serves as a containment vessel during the extrusion process. A solid feed port 76 is disposed in zone 1 and a liquid feed port 78 is disposed in zone 1. A vent 80 is included in zone 7 for cooling and decreasing the liquid, such as water, content of the mixture prior to exiting the extruder. An optional vent stuffer, commercially available from APV Baker, can be employed to prevent the polymer melt composition from exiting through the vent 80. The flow of the polymer melt composition through the barrel 74 is from zone 1 exiting the barrel 74 at zone 8.

Figure 7B:
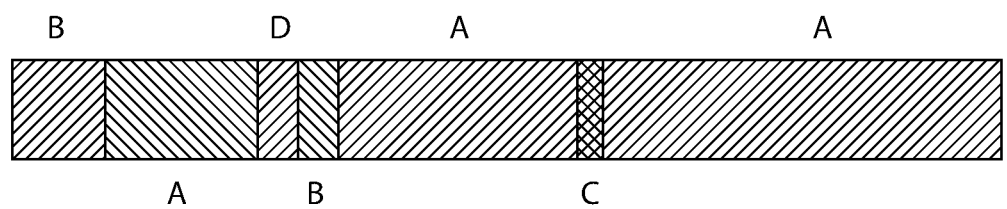
FIG. 7B is a schematic representation of a screw and mixing element configuration for the twin screw extruder of FIG. 7A.
Figure 8:
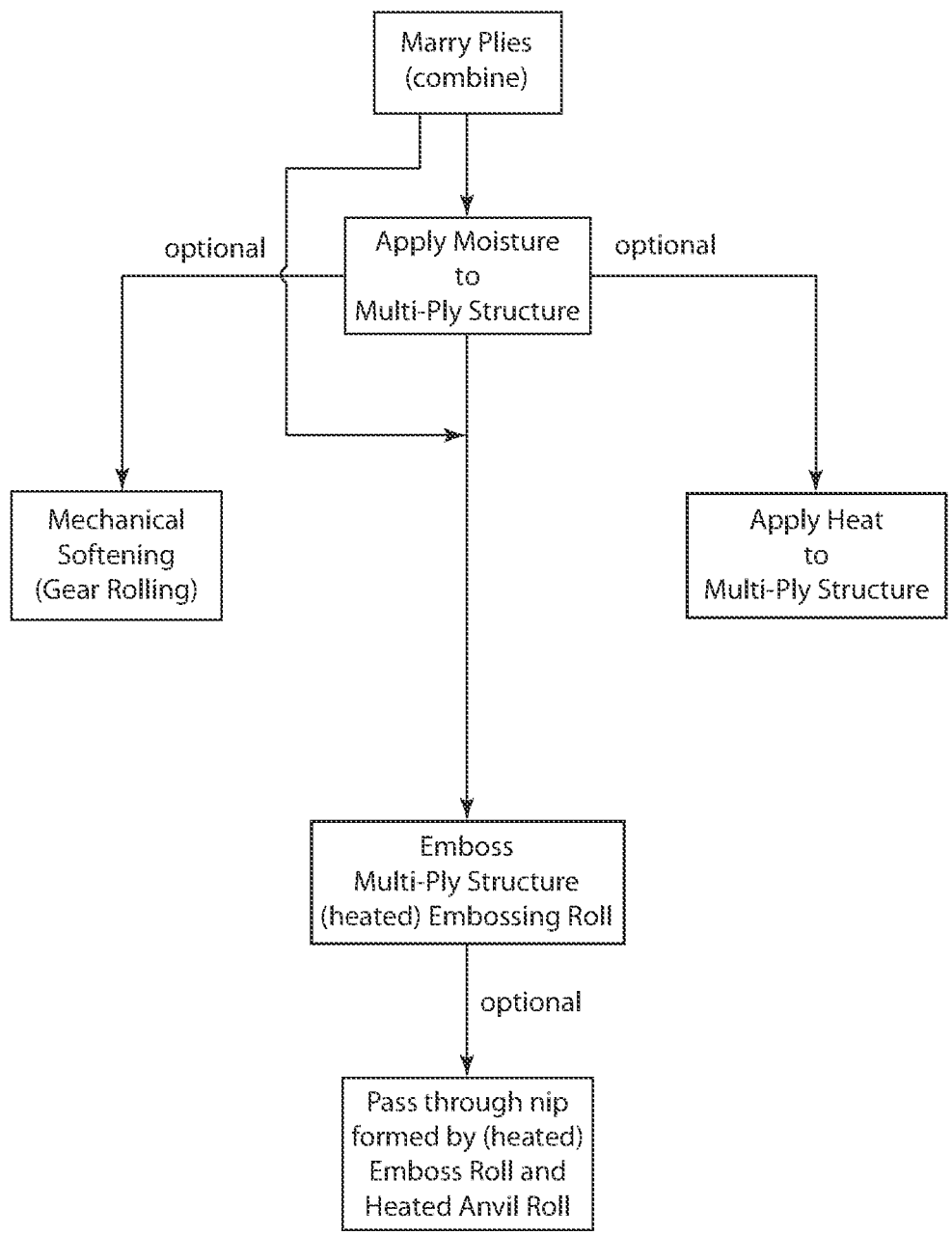
FIG. 8 is a schematic flowchart of an example of an embossing process in accordance with the present invention.

A screw and mixing element configuration for the twin screw extruder is schematically illustrated in FIG. 7B. The twin screw extruder comprises a plurality of twin lead screws (TLS) (designated A and B) and paddles (designated C) and reverse twin lead screws (RTLS) (designated D) installed in series as illustrated in Table 2 below.

TABLE 2

| Zone | Total Length Ratio | Element | Pitch | Length Ratio | Element Type |
|---|---|---|---|---|---|
| 1 | 1.5 | TLS | 1 | 1.5 | A |
| 1 | 3.0 | TLS | 1 | 1.5 | A |
| 1 | 4.5 | TLS | 1 | 1.5 | A |
| 2 | 6.0 | TLS | 1 | 1.5 | A |
| 2 | 7.5 | TLS | 1 | 1.5 | A |
| 2 | 9.0 | TLS | 1 | 1.5 | A |
| 3 | 10.5 | TLS | 1 | 1.5 | A |
| 3 | 12.0 | TLS | 1 | 1.5 | A |
| 3 | 13.0 | TLS | 1 | 1 | A |
| 3 | 14.0 | TLS | 1 | 1 | A |

TABLE 2-continued

| Zone | Total Length Ratio | Element | Pitch | Length Ratio | Element Type |
|---|---|---|---|---|---|
| 4 | 15.0 | TLS | 1 | 1 | A |
| 4 | 16.0 | TLS | 1 | 1 | A |
| 4 | 16.3 | PADDLE | 0 | 0.25 | C |
| 4 | 16.5 | PADDLE | 0 | 0.25 | C |
| 4 | 18.0 | TLS | 1 | 1.5 | A |
| 4 | 19.5 | TLS | 1 | 1.5 | A |
| 5 | 21.0 | TLS | 1 | 1.5 | A |
| 5 | 22.5 | TLS | 1 | 1.5 | A |
| 5 | 24.0 | TLS | 1 | 1.5 | A |
| 5 | 25.0 | TLS | 1 | 1 | A |
| 6 | 25.3 | TLS | 1 | 0.25 | A |
| 6 | 26.3 | TLS | 1 | 1 | A |
| 6 | 27.3 | TLS | 1 | 1 | A |
| 6 | 28.3 | TLS | 0.5 | 1 | B |
| 6 | 29.3 | TLS | 0.5 | 1 | B |
| 6 | 29.8 | RTLS | 0.5 | 0.5 | D |
| 7 | 30.3 | RTLS | 0.5 | 0.5 | D |
| 7 | 30.8 | RTLS | 0.5 | 0.5 | D |
| 7 | 32.3 | TLS | 1 | 1.5 | A |
| 7 | 33.8 | TLS | 1 | 1.5 | A |
| 7 | 34.8 | TLS | 1 | 1 | A |
| 8 | 35.8 | TLS | 1 | 1 | A |
| 8 | 36.8 | TLS | 0.5 | 1 | B |
| 8 | 37.8 | TLS | 0.5 | 1 | B |
| 8 | 38.8 | TLS | 0.5 | 1 | B |
| 8 | 40.3 | TLS | 0.5 | 1.5 | B |

Screw elements (A-B) are characterized by the number of continuous leads and the pitch of these leads. A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and RTLS. Screw element type A is a TLS with a 1.0 pitch and varying length ratios. Screw element type B is a TLS with a 0.5 pitch and varying length ratios.

Bilobal paddles, C, serving as mixing elements, are also included in series with the TLS and RTLS screw elements in order to enhance mixing. Paddle C has a length ratio of 1/4. Various configurations of bilobal paddles and reversing screw elements D, single and twin lead screws threaded in the opposite directions, are used in order to control flow and corresponding mixing time. Screw element D is a RTLS with a 0.5 pitch and a 0.5 length ratio.

In zone 1, the hydroxyl polymer is fed into the solid feed port at a rate of 230 grams/minute using a K-Tron (Pitman, N.J.) loss-in-weight feeder. This hydroxyl polymer is combined inside the extruder (zone 1) with water, an external plasticizer, added at the liquid feed at a rate of 146 grams/minute using a Milton Roy (Ivyland, Pa.) diaphragm pump (1.9 gallon per hour pump head) to form a hydroxyl polymer/water slurry. This slurry is then conveyed down the barrel of the extruder and cooked. Table 3 below describes the temperature, pressure, and corresponding function of each zone of the extruder.

TABLE 3

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 300 | Medium | Pressure Generating | Cooking at Pressure and Temperature |
| 6 | 250 | High | Reversing | Cooking at Pressure and Temperature |
| 7 | 210 | Low | Conveying | Cooling and Conveying (with venting) |
| 8 | 210 | Low | Pressure Generating | Conveying |

After the slurry exits the extruder, part of the melt processed hydroxyl polymer is dumped and another part (100 g) is fed into a Zenith®, type PEP II (Sanford N.C.) and pumped into a SMX style static mixer (Koch-Glitsch, Woodridge, The static mixer is used to combine additives such as crosslinking agent, crosslinking facilitator, external plasticizer, such as water, with the melt processed hydroxyl polymer. The additives are pumped into the static mixer via PREP 100 HPLC pumps (Chrom Tech, Apple Valley Min.). These pumps provide high pressure, low volume addition capability. The polymer melt composition of the present invention is ready to be processed by a polymer processing operation.

Synthesis of Filaments

A non-limiting example of a process for producing filaments by polymer processing a polymer melt composition of the present invention. "Polymer processing" as used herein means any operation and/or process by which a filament comprising a processed hydroxyl polymer is formed from a polymer melt composition. Non-limiting examples of polymer processing operations include extrusion, molding and/or fiber spinning Extrusion and molding (either casting or blown), typically produce films, sheets and various profile extrusions. Molding may include injection molding, blown molding and/or compression molding. Fiber spinning may include spun bonding, melt blowing, rotary spinning, continuous filament producing and/or tow fiber producing. A "processed hydroxyl polymer" as used herein means any hydroxyl polymer that has undergone a melt processing operation and a subsequent polymer processing operation.

One example of a process for making a filament of the present invention from a polymer melt composition of the present invention follows.

A polymer melt composition is prepared according to the Synthesis of a Polymer Melt Composition described above. The polymer melt composition present in the twin screw extruder is pumped to a meltblow die using a suitable pump, such as a Zenith®, type PEP II, having a capacity of 10 cubic centimeters per revolution (cc/rev), manufactured by Parker Hannifin Corporation, Zenith Pumps division, of Sanford, N.C., USA. The hydroxyl polymer's, such as starch, flow to the meltblow die is controlled by adjusting the number of revolutions per minute (rpm) of the pump. Pipes connecting the extruder, the pump, the meltblow die, and optionally a mixer are electrically heated and thermostatically controlled to 65° C.

The meltblow die has several rows of circular extrusion nozzles spaced from one another at a pitch P of about 2.489 mm. The nozzles are arranged in a staggered grid with a spacing of about 2.489 mm within rows and a spacing of 2.159 mm between rows. The nozzles 200 have individual inner diameters of about 0.254 mm and individual outside diameters of about 0.813 mm Each individual nozzle is encircled by an annular orifice formed in an orifice plate having a thickness of about 1.9 mm A pattern of a plurality of the orifices in the orifice plate correspond to a pattern of extrusion nozzles in the meltblow die. Once the orifice plate is combined with the meltblow dies, the resulting area for airflow is about 36 percent. The plate is fixed so that the filaments being extruded through the extrusion nozzles are surrounded and attenuated by generally cylindrical, humidified air streams supplied through the orifices of the orifice plate. The extrusion nozzles can extend to a distance from about 1.5 mm to about 4 mm, and more specifically from about 2 mm to about 3 mm, beyond the exterior surface of the orifice plate. A plurality of boundary-layer air orifices is formed by plugging extrusion nozzles of two outside rows on each side of the plurality of extrusion nozzles, as viewed in plane, so that each of the boundary-layer air orifices comprise an annular orifice described herein above. Additionally, every other row and every other column of the remaining extrusion nozzles are blocked, increasing the spacing between active extrusion nozzles Attenuation air for attenuating the filaments being produced through the extrusion nozzles can be provided by heating compressed air by an electrical-resistance heater, for example, a heater manufactured by Chromalox, Division of Emerson Electric, of Pittsburgh, Pa., USA. An appropriate quantity of steam at an absolute pressure of from about 240 to about 420 kiloPascals (kPa), controlled by a globe valve, is added to saturate or nearly saturate the heated air at the conditions in the electrically heated, thermostatically controlled delivery pipe. Condensate is removed in an electrically heated, thermostatically controlled, separator. The attenuating air has an absolute pressure from about 130 kPa to about 310 kPa, measured in the controlled delivery pipe. The filaments being extruded from the extrusion nozzles have a moisture content of from about 20% and/or from about 25% to about 50% and/or to about 55% by weight. The filaments are dried by a drying air stream having a temperature from about 149° C. to about 315° C. by an electrical resistance heater supplied through drying nozzles and discharged at an angle generally perpendicular relative to the general orientation of the filaments being extruded. The filaments are dried from about 45% moisture content to about 15% moisture content (i.e., from a consistency of about 55% to a consistency of about 85%) and are collected on a collection device, for example a moving foraminous belt.

The process parameters for making the filaments of the present invention are set forth below in Table 4.

TABLE 4

| Sample | Units | Value |
|---|---|---|
| Attenuation Air Flow Rate | G/min | 9000 |
| Attenuation Air Temperature | ° C. | 65 |
| Attenuation Steam Flow Rate | G/min | 1800 |
| Attenuation Steam Gage Pressure | kPa | 213 |
| Attenuation Gage Pressure in Delivery Pipe | kPa | 14 |
| Attenuation Exit Temperature | ° C. | 65 |
| Solution Pump Speed | Revs/min | 12 |
| Solution Flow | G/min/hole | 0.18 |
| Drying Air Flow Rate | g/min | 17000 |
| Air Duct Type | | Slots |
| Air Duct Dimensions | mm | 356 × 127 |
| Velocity via Pitot-Static Tube | M/s | 65 |
| Drying Air Temperature at Heater | ° C. | 260 |
| Dry Duct Position from Die | mm | 80 |
| Drying Duct Angle Relative to Fibers | degrees | 0 |
| Drying Duct to Drying Duct Spacing | mm | 205 |
| Die to Forming Box distance | Mm | 610 |
| Forming Box Machine direction Length | Mm | 635 |
| Forming Box Cross Direction Width | Mm | 380 |
| Forming Box Flowrate | g/min | 41000 |

A crosslinking system via a crosslinking agent, such as an imidazolidinone, may crosslink the hydroxyl polymers together to provide the filament with wet strength, with or without being subjected to a curing step. The crosslinking occurs such that the polymer melt composition is capable of being delivered through the extrusion nozzles and producing filaments. In other words, the crosslinking system does not prematurely crosslink the hydroxyl polymers in the polymer melt composition so that the extrusion nozzles are clogged and thus no filaments can be produced.

The filaments of the present invention do not include coatings and/or other surface treatments that are applied to a pre-existing form, such as a coating on a fiber, film or foam. However, in one embodiment of the present invention, a filament in accordance with the present invention may be coated and/or surface treated with the crosslinking system of the present invention.

In one example, the filaments produced via a polymer processing operation may be cured at a curing temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the filaments may also be cured at room temperature for days, either after curing at above room temperature or instead of curing at above room temperature.

The filaments of the present invention may include melt spun filaments and/or spunbond filaments, hollow filaments, shaped filaments, such as multi-lobal filaments and multi-component filaments, especially bicomponent filaments. The multicomponent filaments, especially bicomponent filaments, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The filaments of the present invention may have different geometries that include round, elliptical, star shaped, rectangular, and other various eccentricities.

Process for Embossing a Fibrous Structure

The fibrous structures of the present invention may be embossed using modifications to known embossing processes, such as rubber-to-steel embossing operations, which utilize a steel embossing roll and a rubber roll, and close tolerance (low pressure, typically less than 80 pli) embossing operations, which utilize mated (for example male and female) embossing rolls. The fibrous structures of the present invention may be embossed at any speed. In one example, the fibrous structures are embossed at a speed of greater than 250 feet per minute (fpm) and/or greater than 500 fpm and/or greater than 1000 fpm and/or greater than 1500 fpm and/or greater than 2000 fpm and/or greater than 2500 fpm and/or greater than 3000 fpm.

Figure 9:
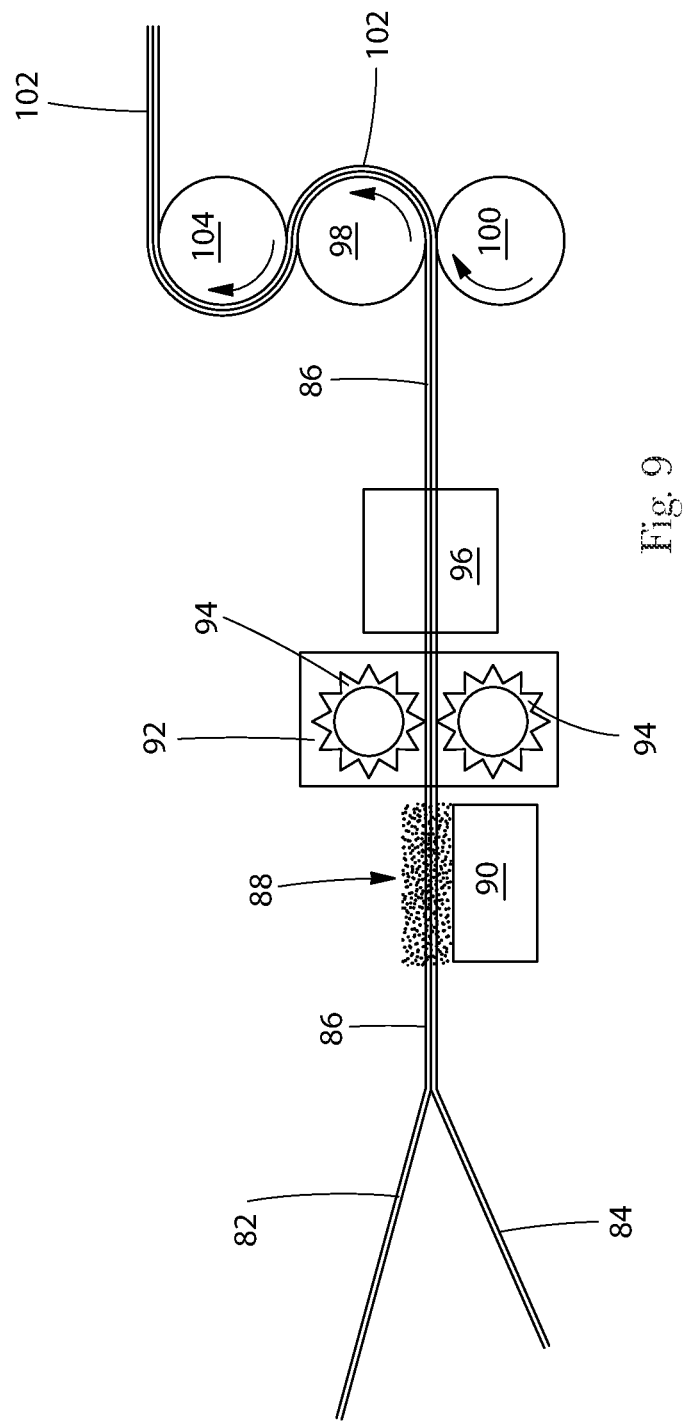
FIG. 9 is a schematic representation of the embossing process according to FIG. 8.

In one example as shown in FIGS. 8 and 9, two or more fibrous structure plies 82 and 84 are married (combined), with or without a plybond glue, such as a hot melt adhesive glue, deposited, for example at about 0.2 gsm add-on, between two or more of the plies 82, 84 to form a multi-ply fibrous structure 86. A non-limiting example of a suitable hot melt adhesive glue is commercially available under the trade name Cycloflex 34-118B from Henkel. Moisture (water and/or steam) 88 may then be applied to the multi-ply fibrous structure 86 via a moisture operation 90. Further, the multi-ply fibrous structure 86 may be subjected to a mechanical softening operation 92, such as being passed through a nip formed by gear rolls 94. The multi-ply fibrous structure 86 may then be subjected to heat (for example from about 100° F. to about 250° F.) at a heating operation 96. Without wishing to be bound by theory, it is believe that the moisture added to the multi-ply fibrous structure 86 prior to embossing results in the modulus of the multi-ply fibrous structure 86 and/or the filaments of the multi-ply fibrous structure 86 to be decreased. The decreased modulus of the multi-ply fibrous structure 86 and/or filaments thereof, increase the flexibility of the multi-ply fibrous structure 86 and/or filaments thereof thus making the multi-ply fibrous structure 86 and/or filaments thereof more easily deformable during the embossing operation. In one example, the moisture level of the multi-ply fibrous structure 86 upon entering the embossing operation may be greater than 8% and/or greater than 10% and/or greater than 11% and/or from about 8% to about 25% and/or from about 10% to about 20% and/or from about 11% to about 15% by weight of the multi-ply fibrous structure 86. The modulus of the multi-ply fibrous structure 86 upon entering the embossing operation may be less than 1000 MPa and/or less than 800 MPa and/or less than 700 MPa and/or less than 600 MPa and/or to about 50 MPa and/or to about 100 MPa.

The multi-ply fibrous structure 86 may then be passed through an embossing nip formed by an emboss roll, such as a steel patterned emboss roll 98 that has a surface temperature of from about 175° F. to about 350° F. and/or from about 200° F. to about 325° F. and/or from about 225° F. to about 300° F. and a rubber roll 100, which may have any suitable hardness, for example about 50 Shore A Durometer, and any suitable rubber thickness, for example about 0.75 inch rubber thickness. The nip pressure of the emboss roll 98 and rubber roll 100 may be any suitable pressure, for example from about 50 pli to about 200 pli and/or from about 60 pli to about 150 pli and/or from 70 pli to about 100 pli. The embossed multi-ply fibrous structure 102 then wraps around the emboss roll 98 and passes through a nip formed by the emboss roll 98 and an anvil roll 104, for example a flat, smooth surface anvil roll. The anvil roll 104 may have a surface temperature of from about 175° F. to about 400° F. and/or from about 175° F. to about 350° F. and/or from about 200° F. to about 325° F. and/or from about 225° F. to about 300° F. The nip pressure of the emboss roll 98 and anvil roll 104 may be any suitable pressure, for example from about 50 pli to about 200 pli and/or from about 75 pli to about 150 pli.

The heated emboss roll 98 may function to drive off the moisture present in the multi-ply fibrous structure 86 when it enters the embossing nip and results in the modulus of the multi-ply fibrous structure 86 and/or filaments thereof increasing. This action makes the embossments more permanent and less likely to relax unlike if the multi-ply fibrous structure's 86 modulus was not decreased prior to entering the embossing nip and then subsequently increased concurrently with and/or after embossing.

In one example, the rubber roll 100 may be replaced with a mated female or male emboss roll in combination with the emboss roll 98 being the other female or male emboss roll in the mated embossing nip.

The embossed multi-ply fibrous structure 102, which may be an embossed multi-ply sanitary tissue product, may be further processed into consumer usable rolls by known processes.

Figure 10:
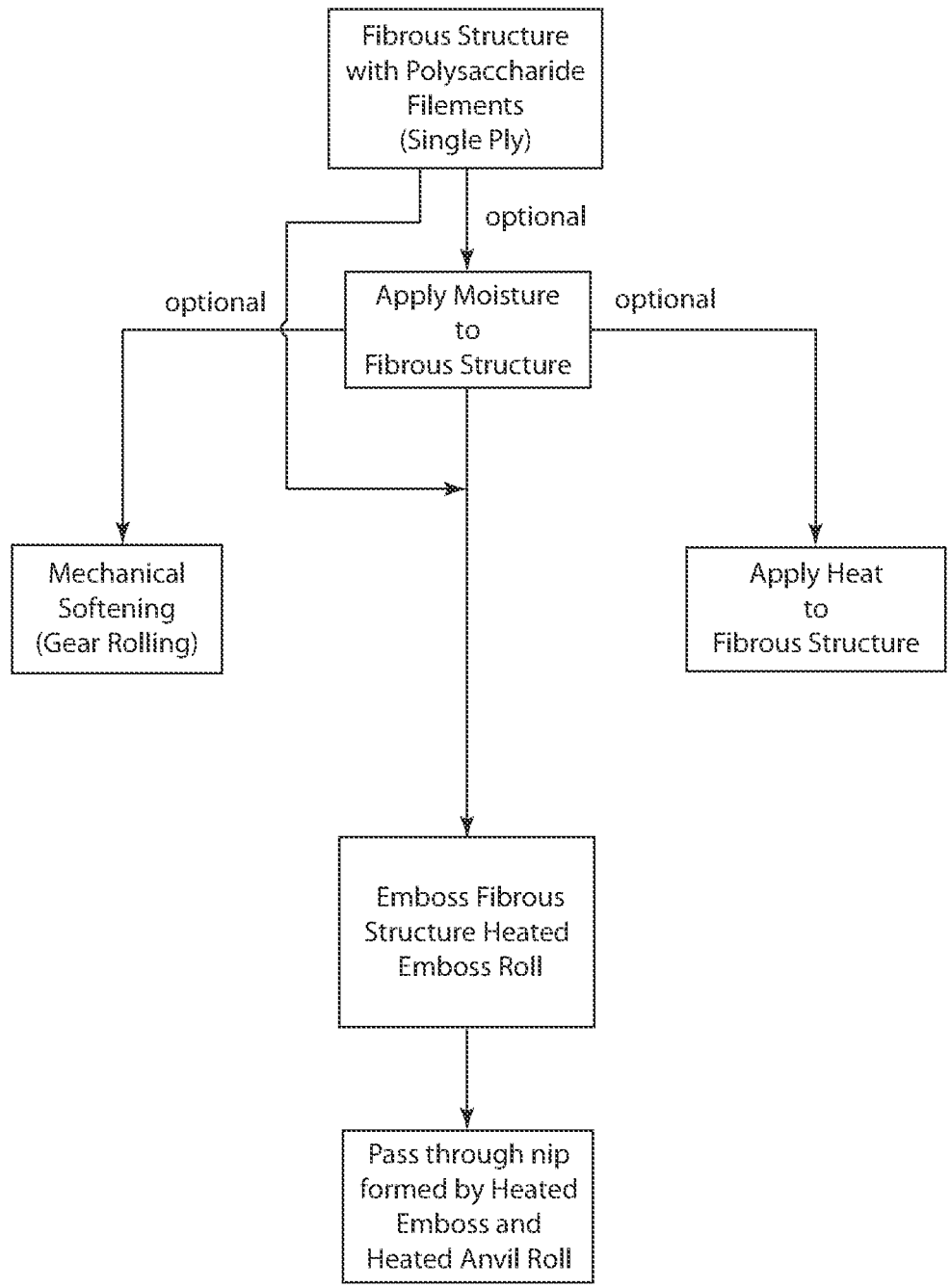
FIG. 10 is a schematic flowchart of another example of an embossing process in accordance with the present invention.
Figure 11:
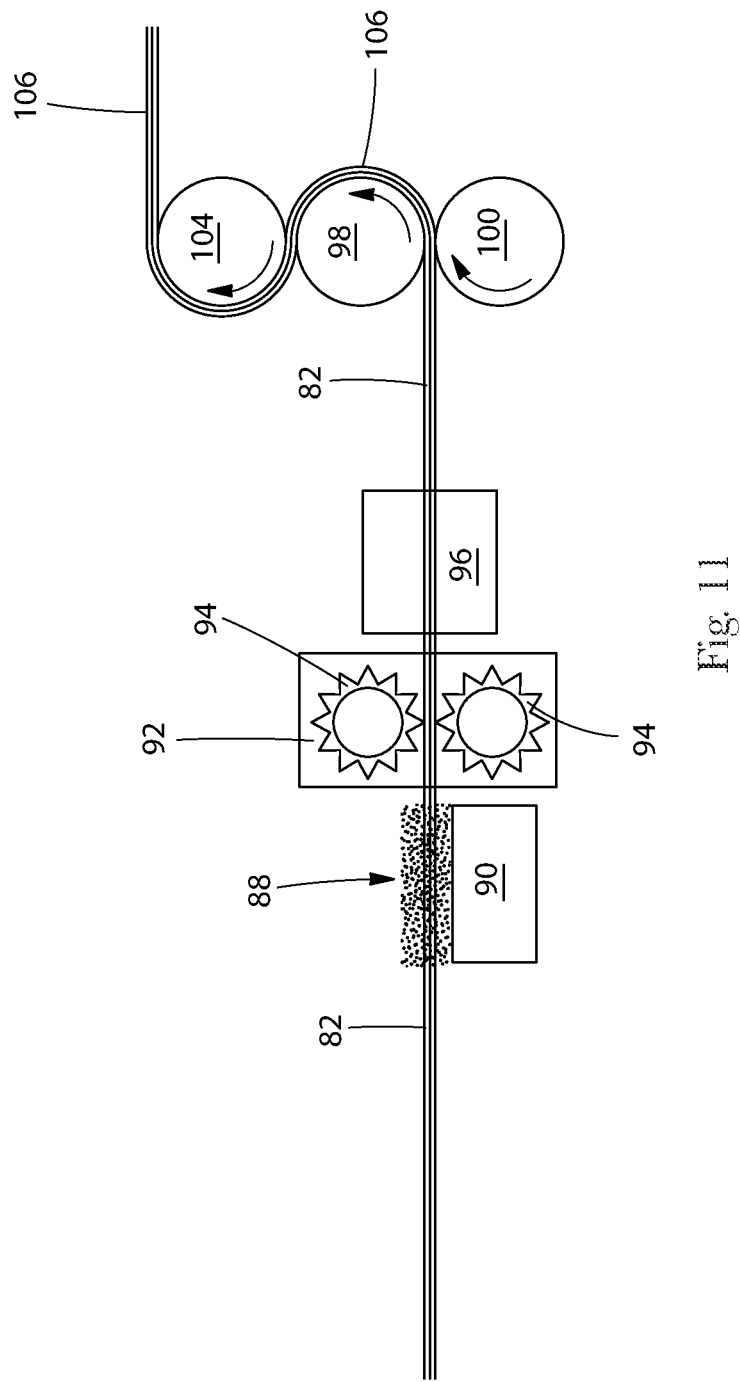
FIG. 11 is a schematic representation of the embossing process according to FIG. 10.

In another example as shown in FIGS. 10 and 11, a fibrous structure single ply 82, which may comprise polysaccharide filaments, may be embossed as follows. Moisture (water and/or steam) 88 may then be applied to the fibrous structure ply 82 via a moisture operation 90. Further, the fibrous structure ply 82 may be subjected to a mechanical softening operation 92, such as being passed through a nip formed by gear rolls 94. The fibrous structure ply 82 may then be subjected to heat (for example from about 100° F. to about 250° F.) at a heating operation 96. Without wishing to be bound by theory, it is believe that the moisture added to the fibrous structure ply 82 prior to embossing results in the modulus of the fibrous structure ply 82 and/or the filaments of the fibrous structure ply 82 to be decreased. The decreased modulus of the fibrous structure ply 82 and/or filaments thereof, increase the flexibility of the fibrous structure ply 82 and/or filaments thereof thus making the fibrous structure ply 82 and/or filaments thereof more easily deformable during the embossing operation. In one example, the moisture level of the fibrous structure ply 82 upon entering the embossing operation may be greater than 8% and/or greater than 10% and/or greater than 11% and/or from about 8% to about 25% and/or from about 10% to about 20% and/or from about 11% to about 15% by weight of the fibrous structure ply 82. The modulus of the fibrous structure ply 82 upon entering the embossing operation may be less than 1000 MPa and/or less than 800 MPa and/or less than 700 MPa and/or less than 600 MPa and/or to about 50 MPa and/or to about 100 MPa.

The fibrous structure ply 82 may then be passed through an embossing nip formed by an emboss roll, such as a steel patterned emboss roll 98 that has a surface temperature of from about 175° F. to about 350° F. and/or from about 200° F. to about 325° F. and/or from about 225° F. to about 300° F. and a rubber roll 100, which may have any suitable hardness, for example about 50 Shore A Durometer, and any suitable rubber thickness, for example about 0.75 inch rubber thickness. The nip pressure of the emboss roll 98 and rubber roll 100 may be any suitable pressure, for example from about 50 pli to about 200 pli and/or from about 60 pli to about 150 pli and/or from 70 pli to about 100 pli. The embossed fibrous structure ply 106 then wraps around the emboss roll 98 and passes through a nip formed by the emboss roll 98 and an anvil roll 104, for example a flat, smooth surface anvil roll. The anvil roll 104 may have a surface temperature of from about 175° F. to about 400° F. and/or from about 175° F. to about 350° F. and/or from about 200° F. to about 325° F. and/or from about 225° F. to about 300° F. The nip pressure of the emboss roll 98 and anvil roll 104 may be any suitable pressure, for example from about 50 pli to about 200 pli and/or from about 75 pli to about 150 pli.

The heated emboss roll 98 may function to drive off the moisture present in the fibrous structure ply 82 when it enters the embossing nip and results in the modulus of the fibrous structure ply 82 and/or filaments thereof increasing. This action makes the embossments more permanent and less likely to relax unlike if the fibrous structure's 82 modulus was not decreased prior to entering the embossing nip and then subsequently increased concurrently with and/or after embossing.

In one example, the rubber roll 100 may be replaced with a mated female or male emboss roll in combination with the emboss roll 98 being the other female or male emboss roll in the mated embossing nip.

The embossed fibrous structure ply 106, which may be an embossed sanitary tissue product or a ply thereof, may be further processed into consumer usable rolls by known processes.

Figure 12:
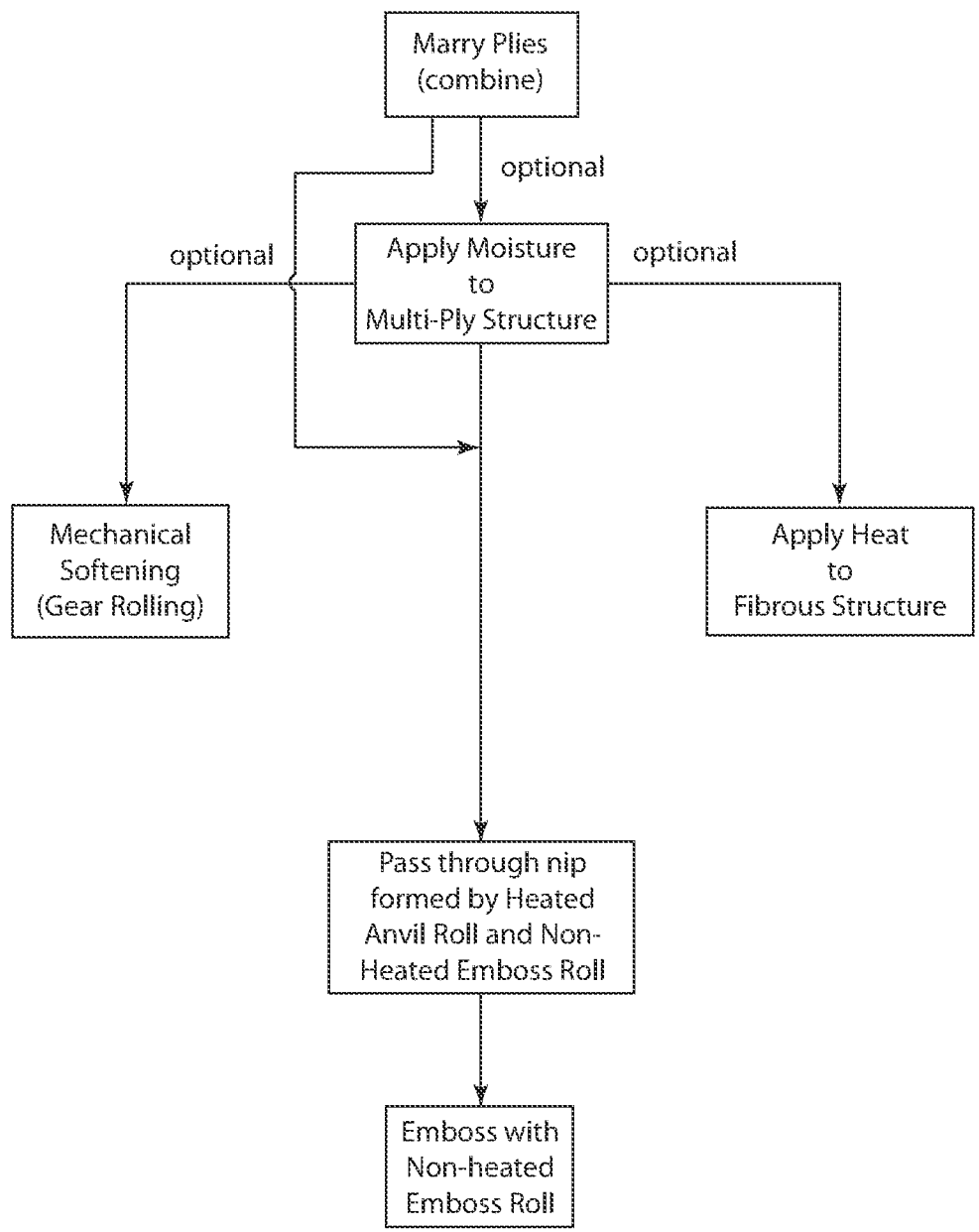
FIG. 12 is a schematic flowchart of an example of an embossing process in accordance with the present invention.
Figure 13:
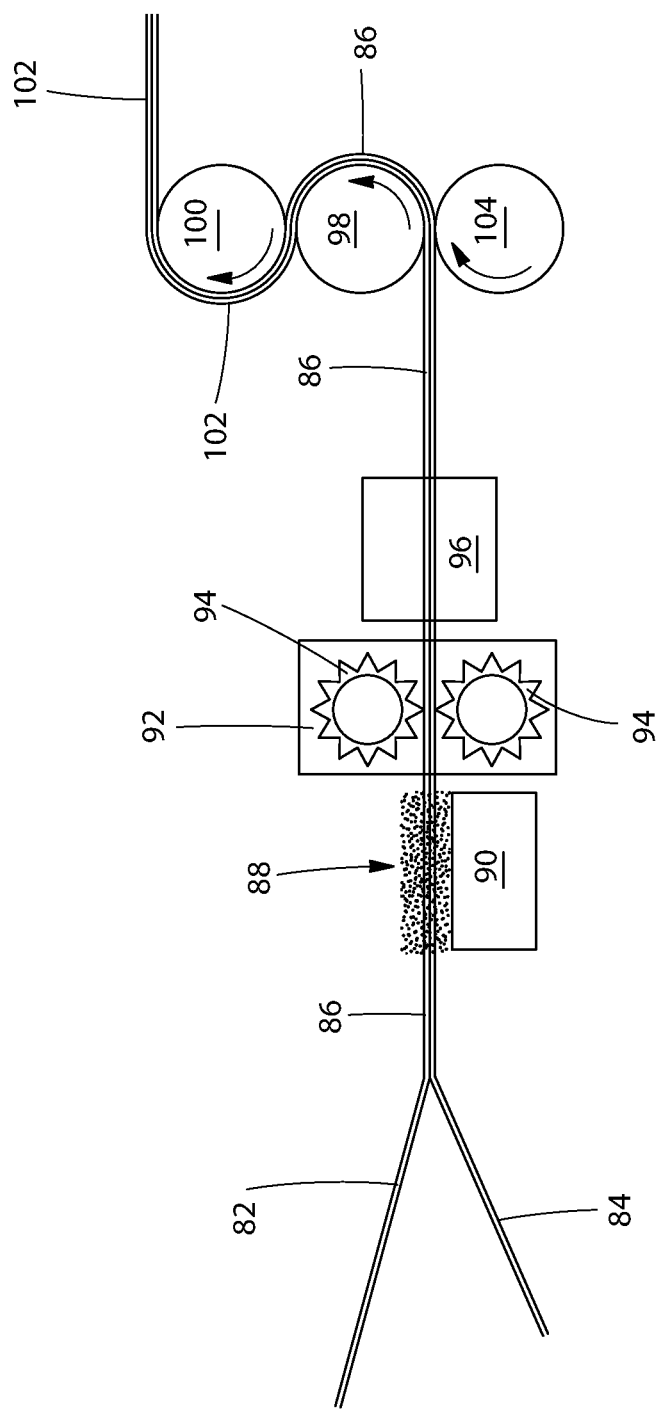
FIG. 13 is a schematic representation of the embossing process according to FIG. 12.

In another example as shown in FIGS. 12 and 13, two or more fibrous structure plies 82 and 84 are married (combined), with or without a plybond glue, such as a hot melt adhesive glue, deposited, for example at about 0.2 gsm add-on, between two or more of the plies 82, 84 to form a multi-ply fibrous structure 86. A non-limiting example of a suitable hot melt adhesive glue is commercially available under the trade name Cycloflex 34-118B from Henkel. Moisture (water and/or steam) 88 may then be applied to the multi-ply fibrous structure 86 via a moisture operation 90. Further, the multi-ply fibrous structure 86 may be subjected to a mechanical softening operation 92, such as being passed through a nip formed by gear rolls 94. The multi-ply fibrous structure 86 may then be subjected to heat (for example from about 100° F. to about 250° F.) at a heating operation 96. Without wishing to be bound by theory, it is believe that the moisture added to the multi-ply fibrous structure 86 prior to embossing results in the modulus of the multi-ply fibrous structure 86 and/or the filaments of the multi-ply fibrous structure 86 to be decreased. The decreased modulus of the multi-ply fibrous structure 86 and/or filaments thereof, increase the flexibility of the multi-ply fibrous structure 86 and/or filaments thereof thus making the multi-ply fibrous structure 86 and/or filaments thereof more easily deformable during the embossing operation. In one example, the moisture level of the multi-ply fibrous structure 86 upon entering the embossing operation may be greater than 8% and/or greater than 10% and/or greater than 11% and/or from about 8% to about 25% and/or from about 10% to about 20% and/or from about 11% to about 15% by weight of the multi-ply fibrous structure 86. The modulus of the multi-ply fibrous structure 86 upon entering the embossing operation may be less than 1000 MPa and/or less than 800 MPa and/or less than 700 MPa and/or less than 600 MPa and/or to about 50 MPa and/or to about 100 MPa.

The multi-ply fibrous structure 86 may then be passed through a nip formed by an emboss roll, such as a steel patterned emboss roll 98 that may exhibit a surface temperature of from about 175° F. to about 350° F. and/or from about 200° F. to about 325° F. and/or from about 225° F. to about 300° F. and an anvil roll 104, for example a flat, smooth surface anvil roll. The anvil roll 104 may have a surface temperature of from about 175° F. to about 400° F. and/or from about 175° F. to about 350° F. and/or from about 200° F. to about 325° F. and/or from about 225° F. to about 300° F. The nip pressure of the emboss roll 98 and anvil roll 104 may be any suitable pressure, for example from about 50 pli to about 200 pli and/or from about 75 pli to about 150 pli.

The multi-ply fibrous structure 86 may then wrap around the emboss roll 98 and pass through an embossing nip formed by the emboss roll 98 and a rubber roll 100, which may have any suitable hardness, for example about 50 Shore A Durometer, and any suitable rubber thickness, for example about 0.75 inch rubber thickness. The nip pressure of the emboss roll 98 and rubber roll 100 may be any suitable pressure, for example from about 50 pli to about 200 pli and/or from about 60 pli to about 150 pli and/or from 70 pli to about 100 pli.

The emboss roll 98, when heated, may function to drive off the moisture present in the multi-ply fibrous structure 86 when it enters the embossing nip and results in the modulus of the multi-ply fibrous structure 86 and/or filaments thereof increasing. This action makes the embossments more permanent and less likely to relax unlike if the multi-ply fibrous structure's 86 modulus was not decreased prior to entering the embossing nip and then subsequently increased concurrently with and/or after embossing.

In one example, the rubber roll 100 may be replaced with a mated female or male emboss roll in combination with the emboss roll 98 being the other female or male emboss roll in the mated embossing nip.

The embossed multi-ply fibrous structure 102, which may be an embossed multi-ply sanitary tissue product, may be further processed into consumer usable rolls by known processes.

Figure 14:
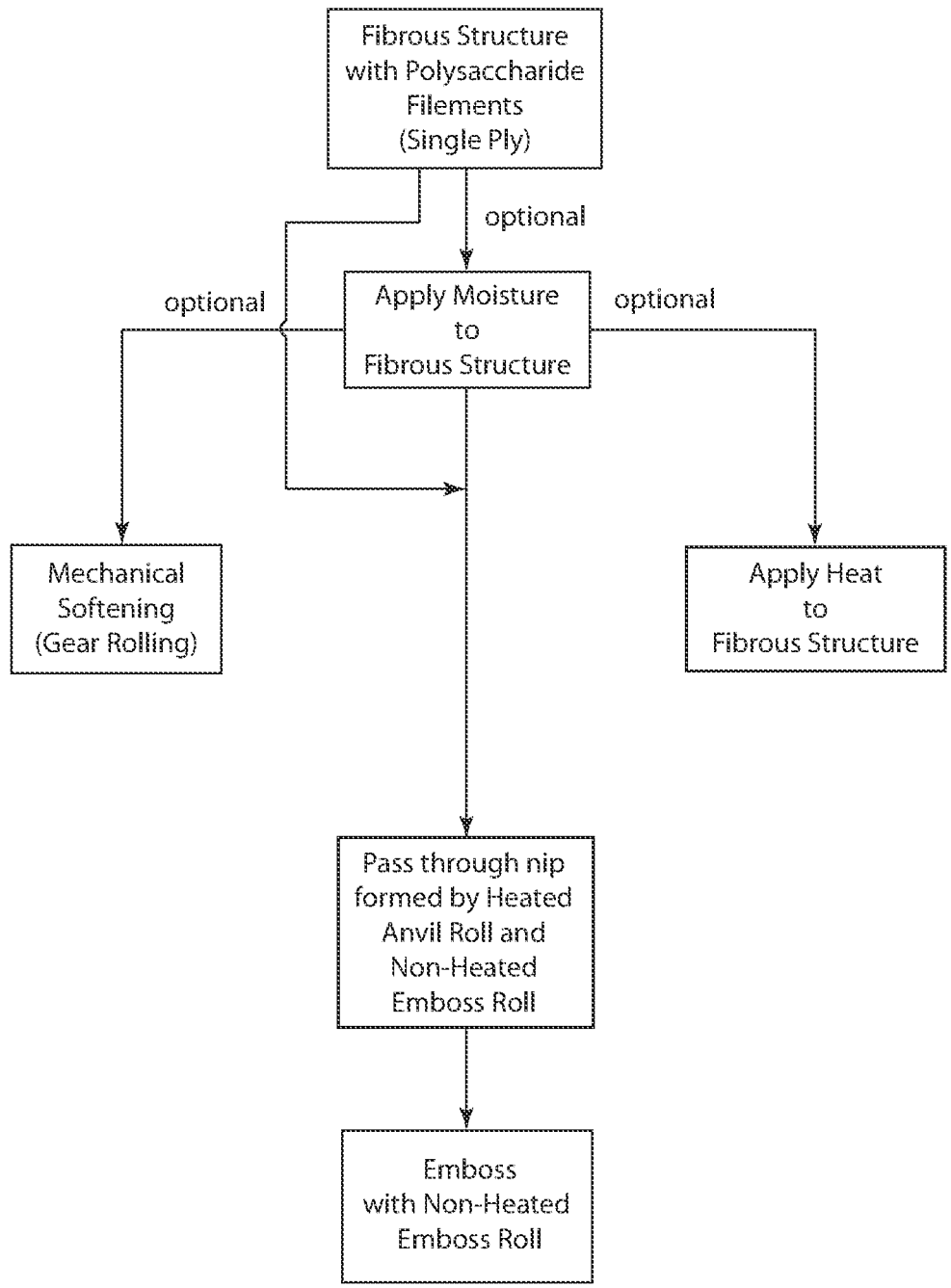
FIG. 14 is a schematic flowchart of another example of an embossing process in accordance with the present invention.
Figure 15:
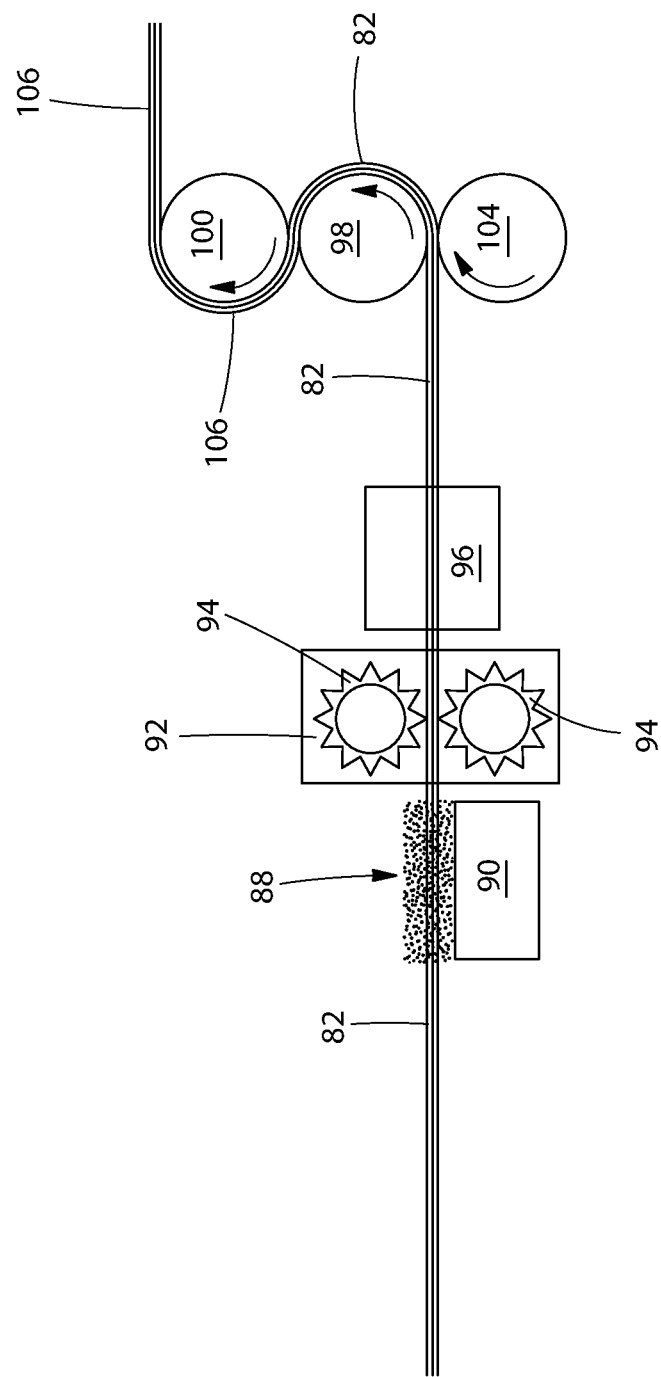
FIG. 15 is a schematic representation of the embossing process according to FIG. 14.

In another example as shown in FIGS. 14 and 15, a fibrous structure single ply 82, which may comprise polysaccharide filaments, may be embossed as follows. Moisture (water and/or steam) 88 may then be applied to the fibrous structure ply 82 via a moisture operation 90. Further, the fibrous structure ply 82 may be subjected to a mechanical softening operation 92, such as being passed through a nip formed by gear rolls 94. The fibrous structure ply 82 may then be subjected to heat (for example from about 100° F. to about 250° F.) at a heating operation 96. Without wishing to be bound by theory, it is believe that the moisture added to the fibrous structure ply 82 prior to embossing results in the modulus of the fibrous structure ply 82 and/or the filaments of the fibrous structure ply 82 to be decreased. The decreased modulus of the fibrous structure ply 82 and/or filaments thereof, increase the flexibility of the fibrous structure ply 82 and/or filaments thereof thus making the fibrous structure ply 82 and/or filaments thereof more easily deformable during the embossing operation. In one example, the moisture level of the fibrous structure ply 82 upon entering the embossing operation may be greater than 8% and/or greater than 10% and/or greater than 11% and/or from about 8% to about 25% and/or from about 10% to about 20% and/or from about 11% to about 15% by weight of the fibrous structure ply 82. The modulus of the fibrous structure ply 82 upon entering the embossing operation may be less than 1000 MPa and/or less than 800 MPa and/or less than 700 MPa and/or less than 600 MPa and/or to about 50 MPa and/or to about 100 MPa.

The fibrous structure ply 82 may then be passed through a nip formed by an emboss roll, such as a steel patterned emboss roll 98 may exhibit a surface temperature of from about 175° F. to about 350° F. and/or from about 200° F. to about 325° F. and/or from about 225° F. to about 300° F. and an anvil roll 104, for example a flat, smooth surface anvil roll. The anvil roll 104 may have a surface temperature of from about 175° F. to about 400° F. and/or from about 175° F. to about 350° F. and/or from about 200° F. to about 325° F. and/or from about 225° F. to about 300° F. The nip pressure of the emboss roll 98 and anvil roll 104 may be any suitable pressure, for example from about 50 pli to about 200 pli and/or from about 75 pli to about 150 pli.

The multi-ply fibrous structure 86 may then wrap around the emboss roll 98 and pass through an embossing nip formed by the emboss roll 98 and a rubber roll 100, which may have any suitable hardness, for example about 50 Shore A Durometer, and any suitable rubber thickness, for example about 0.75 inch rubber thickness. The nip pressure of the emboss roll 98 and rubber roll 100 may be any suitable pressure, for example from about 50 pli to about 200 pli and/or from about 60 pli to about 150 pli and/or from 70 pli to about 100 pli.

The emboss roll 98, when heated, may function to drive off the moisture present in the fibrous structure ply 82 when it enters the embossing nip and results in the modulus of the fibrous structure ply 82 and/or filaments thereof increasing. This action makes the embossments more permanent and less likely to relax unlike if the fibrous structure's 82 modulus was not decreased prior to entering the embossing nip and then subsequently increased concurrently with and/or after embossing.

In one example, the rubber roll 100 may be replaced with a mated female or male emboss roll in combination with the emboss roll 98 being the other female or male emboss roll in the mated embossing nip.

The embossed fibrous structure ply 106, which may be an embossed sanitary tissue product or a ply thereof, may be further processed into consumer usable rolls by known processes.

In one example, the emboss roll 98 (and/or emboss rolls if mated emboss rolls) may be heated (exhibit surface temperatures as described above) and/or may be non-heated (exhibit surface temperatures less than the lowest surface temperature described above).

The nips between the rolls of the embossing operation may range from about 0 inches to about 2 inches and/or from about 0.025 inches to about 1.8 inches and/or from about 0.3 inches to about 1.5 inches.

Non-Limiting Example of a Fibrous Structure

Example—Fibrous Structure Comprising Starch Filaments/Wood Pulp Fibers

A polymer melt composition comprising 7.5% Mowiol 10-98 commercially available from Kuraray Co. (polyvinyl alcohol), 19% Ethylex 2035 commercially available from Tate & Lyle (ethoxylated starch), 19% CPI 050820-156 commercially available from Corn Products International (acid-thinned starch), 0.5% sulfosuccinate surfactant, such as Aerosol AOT, commercially available from Cytec Industries, 0.25% Hyperfloc NF221 commercially available from Hychem, Inc. (polyacrylamide), 3.25% imidazolidinone crosslinking agent (DHEU), and 0.5% ammonium chloride available from Aldrich (crosslinking facilitator) is prepared. The melt composition is cooked and extruded from a co-rotating twin screw extruder at approx 50% solids (50% $H_2O$) as described hereinabove.

The polymer melt composition is then pumped to a series of meltblow spinnerettes that are oriented at different angles to the machine direction to provide a plurality of filaments from each spinneret. The filaments from each spinnerette are attenuated with saturated air stream to form a layer of filaments that are collected one on top of the other to form a nonwoven substrate. The filaments of two or more of the layers of filaments exhibit different orientations with respect to the machine direction. The nonwoven substrate formed exhibits a basis weight of from about 10 g/m² to about 120 g/m² as described hereinabove The filaments are dried by convection drying before being deposited on a belt to form the nonwoven substrate. These meltblown filaments are essentially continuous filaments.

If two or more spinnerettes are used to make a source of filaments, such as by abutting two or more spinnerettes together, then the spinnerette assembly may be made by abutting a first spinnerette with a second spinnerette such that the maximum distance between a seam filament forming nozzle opening in the first spinnerette and a seam filament forming nozzle opening in the second spinnerette is less than 9 mm and/or less than 7 mm and/or less than 5 mm. In addition to the abutting spinnerettes, an air plate is used in the spinnerette assembly to cover the seam formed by the abutting spinnerettes. The air plates' purpose to result in air flow that avoids causing the filaments produced by the spinnerette assemblies to collide with neighboring filaments which can result in roping of filaments and/or spitters from the spinnerette assemblies.

Wood pulp fibers, Southern Softwood Kraft (SSK) commercially available from Georgia Pacific available as roll comminution pulp, is disintegrated by a hammermill and conveyed to an airlaid former commercially available from Dan-Web via a blower. The wood pulp fibers are deposited onto a surface of the nonwoven substrate as solid additives.

Additional polymer melt composition is pumped to an additional meltblow spinnerette that is oriented at an angle to the machine direction of about 90° to produce an additional layer of filaments (which is a scrim), which is deposited on top of the wood pulp fibers to position the wood pulp fibers between the nonwoven substrate and the scrim to form a fibrous structure. The scrim typically exhibits a basis weight of from about 0.1 g/m² to about 10 g/m².

The fibrous structure is then subjected to a bonding process wherein bond sites are formed between the nonwoven substrate and the scrim such that the wood pulp fibers are positioned between the nonwoven substrate and the scrim to form a finished fibrous structure. The bonding process can be used to impart a pattern to the finished fibrous structure. The fibrous structure can be subjected to humidification during the fibrous structure making process, for example prior to being bonded and/or embossed and/or heated during the embossing operation.

Two or more plies of the fibrous structure are then married (combined) with a plybond glue (for example a hot melt adhesive) and then the multi-ply fibrous structure is subjected to humidification, gear rolling and then embossed with a heated emboss roll according to the present invention. The embossed multi-ply finished fibrous structure is then convolutely wound about a core to produce an embossed multi-ply sanitary tissue product.

The embossed multi-ply sanitary tissue product exhibits a Tensile Ratio of 2 or less.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted under the same environmental conditions and in such conditioned room. Do not test samples that have defects such as wrinkles, tears, holes, and like. Samples conditioned as described herein are considered dry samples (such as "dry filaments") for testing purposes. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft² or g/m² as follows:

$$\text{Basis Weight} = (\text{Mass of stack})/[(\text{Area of 1 square in stack}) \times (\text{No. of squares in stack})]$$

For example, $$\text{Basis Weight (lbs/3000 ft}^2\text{)} = [[\text{Mass of stack (g)}/453.6 \text{ (g/lbs)}]/[12.25 \text{ (in}^2\text{)}/144 \text{ (in}^2\text{/ft}^2\text{)} \times 12]] \times 3000$$

or, $$\text{Basis Weight (g/m}^2\text{)} = \text{Mass of stack (g)}/[79.032 \text{ (cm}^2\text{)}/10{,}000 \text{ (cm}^2\text{/m}^2\text{)} \times 12]$$

Report result to the nearest 0.1 lbs/3000 ft² or 0.1 g/m². Sample dimensions can be changed or varied using a similar precision cutter as mentioned above, so as at least 100 square inches of sample area in stack.

Dry Tensile Strength Test Method

Tensile Strength is measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing-Albert JDC-1-10, or similar) take a CD stack and cut one, 1.00 in ±0.01 in wide by 3-4 in long stack of strips (long dimension in CD). In like fashion cut the remaining stack in the MD (strip's long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gage length to 1.00 inch. Zero the crosshead and load cell. Insert the specimen into the upper and lower open grips such that at least 0.5 inches of specimen length is contained each grip. Align specimen vertically within the upper and lower jaws, then close the upper grip. Verify specimen is aligned, then close lower grip. The specimen should be fairly straight between grips, with no more than 5.0 g of force on the load cell. Start the tensile tester and data collection. Repeat testing in like fashion for all four CD and four MD specimens.

Program the software to calculate the following from the constructed force (g) verses extension (in) curve:

Tensile Strength is the maximum peak force (g) divided by the specimen width (1 in), and reported as g/M to the nearest 1 g/M.

The Tensile Strength (g/in) is calculated for the four CD unitary specimens and the four MD unitary specimens. Calculate an average for each parameter separately for the CD and MD specimens.

Calculations:

Tensile Ratio=MD Tensile Strength (g/in)/CD Tensile Strength (g/in)

Embossment Height Test Method

Embossment height is measured using a GFM Primos Optical Profiler instrument commercially available from GFMesstechnik GmbH, Warthestraβe 21, D14513 Teltow/Berlin, Germany. The GFM Primos Optical Profiler instrument includes a compact optical measuring sensor based on the digital micro mirror projection, consisting of the following main components: a) DMD projector with 1024×768 direct digital controlled micro mirrors, b) CCD camera with high resolution (1300×1000 pixels), c) projection optics adapted to a measuring area of at least 27×22 mm, and d) recording optics adapted to a measuring area of at least 27×22 mm; a table tripod based on a small hard stone plate; a cold light source; a measuring, control, and evaluation computer; measuring, control, and evaluation software ODSCAD 4.0, English version; and adjusting probes for lateral (x-y) and vertical (z) calibration.

The GFM Primos Optical Profiler system measures the surface height of a sample using the digital micro-mirror pattern projection technique. The result of the analysis is a map of surface height (z) vs. xy displacement. The system has a field of view of 27×22 mm with a resolution of 21 microns. The height resolution should be set to between 0.10 and 1.00 micron. The height range is 64,000 times the resolution.

To measure a fibrous structure sample do the following:
1. Turn on the cold light source. The settings on the cold light source should be 4 and C, which should give a reading of 3000K on the display;
2. Turn on the computer, monitor and printer and open the ODSCAD 4.0 Primos Software.
3. Select "Start Measurement" icon from the Primos taskbar and then click the "Live Pic" button.
4. Place a 30 mm by 30 mm sample of fibrous structure product conditioned at a temperature of 73° F.±2° F. (about 23° C.±1° C.) and a relative humidity of 50%±2% under the projection head and adjust the distance for best focus.
5. Click the "Pattern" button repeatedly to project one of several focusing patterns to aid in achieving the best focus (the software cross hair should align with the projected cross hair when optimal focus is achieved). Position the projection head to be normal to the sample surface.
6. Adjust image brightness by changing the aperture on the lens through the hole in the side of the projector head and/or altering the camera "gain" setting on the screen. Do not set the gain higher than 7 to control the amount of electronic noise. When the illumination is optimum, the red circle at bottom of the screen labeled "I.O." will turn green.
7. Select Technical Surface/Rough measurement type.
8. Click on the "Measure" button. This will freeze on the live image on the screen and, simultaneously, the image will be captured and digitized. It is important to keep the sample still during this time to avoid blurring of the captured image. The image will be captured in approximately 20 seconds.
9. If the image is satisfactory, save the image to a computer file with ".omc" extension. This will also save the camera image file ".kam".
10. To move the date into the analysis portion of the software, click on the clipboard/man icon.
11. Now, click on the icon "Draw Cutting Lines". Make sure active line is set to line 1. Move the cross hairs to the lowest point on the left side of the computer screen image and click the mouse. Then move the cross hairs to the lowest point on the right side of the computer screen image on the current line and click the mouse. Now click on "Align" by marked points icon. Now click the mouse on the lowest point on this line, and then click the mouse on the highest point on this line. Click the "Vertical" distance icon. Record the distance measurement. Now increase the active line to the next line, and repeat the previous steps, do this until all lines have been measured (six (6) lines in total. Take the average of all recorded numbers, and if the units is not micrometers, convert it to micrometers (μm). This number is the embossment height. Repeat this procedure for another image in the fibrous structure product sample and take the average of the embossment heights.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A roll of embossed multi-ply sanitary tissue product formed by embossing a multi-ply fibrous structure comprising: 1) a first ply of fibrous structure comprising from about 50% to about 95% by weight of a layer of filaments in contact with a plurality of solid additives, wherein the filaments exhibit a length of greater than or equal to 5.08 cm and wherein the filaments are selected from the group consisting of crosslinked starch filaments, crosslinked starch derivative filaments, crosslinked starch copolymer filaments and mixtures thereof, and wherein the filaments further comprise a first polymer selected from the group consisting of: polyacrylamide and its derivatives; polyacrylic acid, polymethacrylic acid, and their esters, polyethyleneimine, copolymers made from mixtures of monomers of the aforementioned polymers, and mixtures thereof, and 2) a second ply of fibrous structure attached to the first ply of fibrous structure by plybond glue to form the multi-ply fibrous structure, wherein the multi-ply fibrous structure is contacted with moisture making the multi-ply fibrous structure more easily deformable as the filaments' modulus decreases, and then subsequently contacting the multi-ply fibrous structure with at least one heated patterned emboss roll resulting in the filaments' modulus increasing, wherein the at least one heated patterned embossed roll comprises an emboss design such that a decorative surface comprising the emboss design is produced on a surface of the multi-ply fibrous structure to form an embossed multi-ply fibrous structure such that the emboss design is more permanent than such an emboss design imparted to the multi-ply fibrous structure without decreasing its modulus prior to imparting the emboss design and then increasing its modulus.

2. The roll of embossed multi-ply sanitary tissue product according to claim 1 wherein one or more of the filaments further comprises a second polymer selected from the group consisting of: polyvinyl alcohol, polyvinyl alcohol derivatives, polyvinyl alcohol copolymers, chitosan, chitosan derivatives, chitosan copolymers, cellulose, cellulose derivatives, cellulose copolymers, hemicellulose, hemicellulose derivatives, hemicellulose copolymers, gums, arabinans, galactans, proteins, and mixtures thereof.

3. The roll of embossed multi-ply sanitary tissue product according to claim 1 wherein the first polymer exhibits a weight average molecular weight of greater than 500,000 g/mol.

4. The roll of embossed multi-ply sanitary tissue product according to claim 1 wherein the first polymer comprises polyacrylamide.

5. The roll of embossed multi-ply sanitary tissue product according to claim 1 wherein one or more of the filaments comprises a surfactant.

6. The roll of embossed multi-ply sanitary tissue product according to claim 5 wherein the surfactant comprises a sulfosuccinate surfactant.

7. The roll of embossed multi-ply sanitary tissue product according to claim 1 wherein the embossed multi-ply sanitary tissue product exhibits a basis weight of from about 10 $g/m^2$ to about 120 $g/m^2$.

8. The roll of embossed multi-ply sanitary tissue product according to claim 1 wherein at least one of the plurality of solid additives comprises a pulp fiber.

9. The roll of embossed multi-ply sanitary tissue product according to claim 8 wherein the pulp fiber is selected from the group consisting of hardwood pulp fibers, softwood pulp fibers and mixtures thereof.

10. The roll of embossed multi-ply sanitary tissue product according to claim 1 wherein the second ply of fibrous structure is the same as the first ply of fibrous structure.

11. The roll of embossed multi-ply sanitary tissue product according to claim 1 wherein the second ply of fibrous structure is different from the first ply of fibrous structure.

12. The roll of embossed multi-ply sanitary tissue product according to claim 1 wherein the second ply of fibrous structure comprises a plurality of filaments.

13. The roll of embossed multi-ply sanitary tissue product according to claim 12 wherein the filaments of the second ply of fibrous structure comprises polysaccharide filaments.

* * * * *